United States Patent
Nakamura

(10) Patent No.: US 7,959,279 B2
(45) Date of Patent: *Jun. 14, 2011

(54) INK COMPOSITION, INK JET RECORDING METHOD, METHOD FOR PRODUCING PLANOGRAPHIC PRINTING PLATE AND PLANOGRAPHIC PRINTING PLATE

(75) Inventor: Ippei Nakamura, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 926 days.

This patent is subject to a terminal disclaimer.

(21) Appl. No.: 11/603,188

(22) Filed: Nov. 22, 2006

(65) Prior Publication Data

US 2007/0115327 A1 May 24, 2007

(30) Foreign Application Priority Data

Nov. 22, 2005 (JP) ................................. 2005-337799

(51) Int. Cl.
*G01D 11/00* (2006.01)
(52) U.S. Cl. .............................. 347/100; 347/95; 347/96
(58) Field of Classification Search .................. 347/100, 347/96, 95, 101, 102; 106/31.27, 31.13, 106/31.6; 523/160
See application file for complete search history.

(56) References Cited

U.S. PATENT DOCUMENTS 7,741,380 B2 * 6/2010 Nakamura ................. 106/31.13

2003/0105201 A1 * 6/2003 Auschra et al. ............... 524/415
2006/0178449 A1 * 8/2006 Tsuchimura et al. ......... 523/160
2006/0258776 A1 * 11/2006 Aoai ............................ 347/100

FOREIGN PATENT DOCUMENTS

| EP | 1 688 467 A | 8/2006 |
| GB | 1 590 414 A | 6/1981 |
| JP | 54-117203 A | 9/1979 |
| JP | 62 070465 A | 3/1987 |
| JP | 06 321863 A | 11/1994 |
| JP | 2003/192943 A | 7/2003 |
| JP | 2003-192943 A | 7/2003 |

OTHER PUBLICATIONS

Bruce M. Monroe., "Photoinitiators for Free-Radical-Initialed Photoimaging Systems" Chemical Reviews, vol. 93, pp. 435-448 (1993).

NIP21, Final Program and Proceedings of 21st International Conference on Digital Printing Technologies, Baltimore, Maryland USA (Sep. 18-23, 2005), pp. 324-331.

* cited by examiner

*Primary Examiner* — Manish S Shah
(74) *Attorney, Agent, or Firm* — Sughrue Mion, PLLC

(57) ABSTRACT

The invention provides an ink composition including (A) a polymerization initiator and (B) a (meth)acrylic acid ester having an alicyclic group as a substituent or amide having an alicyclic group as a substituent. The ink composition preferably further contains (D) a colorant and (E) a sensitizing dye. The ink composition is used for ink jet recording.

28 Claims, No Drawings

INK COMPOSITION, INK JET RECORDING METHOD, METHOD FOR PRODUCING PLANOGRAPHIC PRINTING PLATE AND PLANOGRAPHIC PRINTING PLATE

CROSS-REFERENCE TO RELATED APPLICATION

This application claims priority under 35USC119 from Japanese Patent Application No. 2005-337799, the disclosure of which is incorporated by reference herein.

BACKGROUND OF THE INVENTION

1. Field of the Invention

The invention relates to an ink composition suitably used for ink jet recording, an ink jet recording method, and a planographic printing plate obtained by using the ink composition, and a method for producing the same. More particularly, the invention relates to an ink composition that it is curable with high sensitivity by irradiation of activation radiation, to thus form a cured material having sufficient flexibility, and that is suitable for ink jet recording, an ink jet recording method, and a planographic printing plate obtained by using the ink composition and a method for producing the same.

2. Description of the Related Art

Examples of methods for forming an image on a recording medium such as paper based on an image data signal include electrophotographic methods, sublimation-type thermal transfer methods, fusion-type thermal transfer methods, and ink jet recording methods. The electrophotographic methods require a process of forming an electrostatic latent image on a photoreceptor drum by charging and light exposure, and the system therefore becomes complicated, resulting in increased production cost. The thermal transfer methods can be conducted by an inexpensive apparatus, but require use of ink ribbons, resulting in increased running cost and generation of waste.

The ink jet recording methods can also be conducted by an inexpensive apparatus. Moreover, an image is directly formed by ejecting ink only to the required area of an image recording medium, and the ink can therefore be efficiently used, leading to reduced running costs. Further, ink jet recording apparatuses are not noisy. Accordingly, ink jet recording methods are excellent image forming methods.

There is a demand for an ink composition, such as an ink composition for ink jet recording, which cures by irradiation of actinic radiation such as ultraviolet rays with high sensitivity to form high-quality images (radiation-curable ink composition). By achieving high sensitivity of an ink composition, the composition can be imparted with a high degree of curing by irradiation with actinic radiation, leading to reduced power consumption and reduced load applied to an actinic radiation generator, which lengthen the lifetime of the generator. Moreover, by sufficient curing, various advantages can be obtained, such as suppression of vaporization of uncured low-molecular weight substances and suppression of deterioration of strength of images formed. In addition, when the ink composition is used to form image regions of a planographic printing plate, improved strength of images, due to the high sensitivity, brings increased printing durability to the image regions.

Ink jet methods involving UV curing have been attracting attention recently, since the methods generate relatively weak odor and enable images to be recorded on recording media that do not have a quick drying property or an ink absorbing property. In such a method, benzil, benzoin, benzoin ethyl ether, Michler's ketone, anthraquinone, acridine, phenazine, benzophenone, or 2-ethylanthraquinone is generally used as a photopolymerization initiator (see Chemical Review, Vol. 93, pp. 435-448, written by Bruce M. Monroe et al., and published in 1993). However, a photopolymerizable composition including such a photopolymerization initiator, which has low sensitivity, requires a long time for image-wise exposure when forming images. Therefore, in a case where the image to be formed has fine detail, if there is a slight vibration during the operation, images with good image quality cannot be obtained. Further, since a long exposure time is accompanied by an increase in energy radiation from the exposure light source, the effect of considerable heat generation resulting from radiation needs to be taken into account.

For the purpose of providing an ink composition that is highly safe, gives low skin irritation and low skin sensitizing, and allows printing of an image having high adhesiveness, even on a substrate (recording medium) on which it is usually difficult to directly form an image, with high sensitivity and with no ink bleeding by an ink jet recording method, compositions containing polymerizable compounds that are particular acrylate compounds have been proposed, (see, for example, Japanese Patent Application Laid-Open (JP-A) No. 2003-192943). However, since a polymer obtained by curing a polyfunctional acrylate used to improve sensitivity has a highly cross-linked three-dimensional structure, an image obtained by curing an ink including such a polyfunctional acrylate has a low flexibility and impact resistance, and therefore, the image thus formed easily cracks on the recording medium or peels off, and the durability of the image is problematic.

Conventionally, in preparing planographic printing plates, so-called PS plates having an oleophilic photosensitive resin layer on a hydrophilic support are used, and the photosensitive resin layer is image-wise exposed to light to form exposed regions having increased or decreased solubility in an alkaline developing solution, and non-image regions are dissolved in the alkaline developing solution and removed. However, along with recent widespread computerization in which image information is electronically processed, stored and output with a computer, there is a need for a new image output method applicable to computerization. In particular, methods of producing a printing plate without use of a developing solution are being studied, and a method in which a planographic printing plate is directly prepared by using an ink composition for ink jet recording has been considered (see, for example, JP-A No. S54-117203). In this method, a printing plate with a desired image, which is preferably hydrophobic, is formed by image-wise ejecting ink onto the surface of a preferably hydrophobic support in an ink jet recording manner and irradiating the ink with actinic radiation to cure the ink. In order to form image regions of a planographic printing plate, it is preferred that ink droplets deposited on the support cure rapidly without bleeding, it is preferred that the cured image regions have excellent strength and strong adhesiveness to the support, and, when the planographic printing plate is being loaded in a printing machine, it is preferred that the image regions conform to the deformation of the support without generation of damage such as cracks. Accordingly, there is currently a need for an ink composition suitable for such an application.

SUMMARY OF THE INVENTION

The present invention has been made under the above circumstances.

According to an aspect of the present invention, there is provided an ink composition comprising (A) a polymerization initiator and (B) a (meth)acrylic acid ester having an alicyclic group as a substituent or an amide having an alicyclic group as a substituent.

According to another aspect of the present invention, there is provided an ink jet recording method comprising (i-1) ejecting the ink composition of the invention onto a recording medium; and (ii-1) curing the ejected ink composition by radiating actinic radiation to the ink composition.

According to an another aspect of the present invention, there is provided a method of producing a planographic printing plate, comprising (i-2) ejecting the ink composition of the invention onto a hydrophilic support; and (ii-2) curing the ejected ink composition by radiating actinic radiation to the ink composition and thereby forming a hydrophobic image of the cured ink composition on the hydrophilic support.

DETAILED DESCRIPTION OF THE INVENTION

Although the reaction mechanism of the invention is not clarified but assumed as follows.

A composition of the invention contains (A) a polymerization initiator and (B) a (meth)acrylic acid ester having an alicyclic group as a substituent or amide having an alicyclic group as a substituent. The polymerizable compound (B), which characterizes the invention, is supposed to suppress decrease in the volume accompanied by generation a covalent bond even if curing is promoted attributed to a high bulky property and low mobility of the alicyclic moiety. As a result, since application of resilient power accompanied by the volume shrinkage of the compound with respect to a substrate whose volume is scarcely changed through the curing reaction is considerably reduced, it is assumed that the adhesiveness of the cured coating with the substrate can be kept well.

Further, in the coating film after the curing reaction, since the interaction among respective compounds having the alicyclic group as the substituent group is extremely weak, the coating film obtained by the composition of the invention has an advantage that the coating film is excellent in the flexibility as compared with the film obtained by a common polymerizable compound which causes shrinkage in the volume by curing.

When a colored image is formed by using the ink composition of the invention, the ink composition of the invention can further include at least one colorant. The ink composition of the invention is suitable for ink jet recording, since it is cured with high sensitivity by irradiation with radiation ray to form a layer with improved flexibility.

According to the invention, use of a specified polymerizable compound for the ink composition provides the ink composition with improved flexibility after ink curing while keeping high sensitivity and high ink ejecting property, particle shape retainability, and adhesiveness to the recording medium and also provides a planographic printing plate and a production method of the planographic printing plate using the ink composition curable and highly sensitive to actinic radiation (especially, preferably UV rays).

<Ink Composition>

The ink composition of the invention contains (A) a polymerization initiator and (B) a (meth)acrylic acid ester having an alicyclic group as a substituent or amide having an alicyclic group as a substituent. The ink composition of the invention can be usable preferably for ink jet recording.

Hereinafter, indispensable components of the ink composition of the invention will be successively described.

[(B) (Meth)Acrylic Acid Ester or Amide Having Alicyclic Group as Substituent]

The ink composition of the invention contains (B) a (meth)acrylic acid ester or amide having an alicyclic group as a substituent.

Hereinafter, (B) the (meth)acrylic acid ester or amide having an alicyclic group as a substituent will be described.

Any (meth)acrylic acid ester or amide having an alicyclic group as a substituent may be used as the component (B). The ring of the alicyclic structure is preferably a 3- to 10-membered ring and in terms of the stability and the availability, a 4- to 7-membered ring is more preferable; a 5- or 6-membered ring is even more preferable; and a 6-membered ring is especially preferable.

In light of the bulky property of the above-mentioned alicyclic ring structure, the ring preferably has a substituent group and examples of a preferable substituent group may include a hydrocarbon group having 1 to 8 carbon atoms and an alkyl group can be exemplified as a preferable hydrocarbon group. Among alkyl groups, substituent groups with a rigid structure are preferable and examples of the preferable substituent groups are methyl; a branched alkyl group such as tert-butyl and isobutyl; and a cycloalkyl group such as cyclohexyl and cyclopentyl; and methyl is a particularly preferable substituent group.

The number of the substituent group existing in the alicyclic structure is preferably 1 to 4, and more preferably 2 or 3.

The alicyclic structure is preferably a structure having no bridge-like bond, that is, having no so-called condensed ring structure, in light of maintaining compatibility with other components contained in the ink composition.

Preferable examples as the (meth)acrylic acid ester having an alicyclic group as a substituent or amide having an alicyclic group as a substituent may be compounds defined by the following formulas (I) and (II).

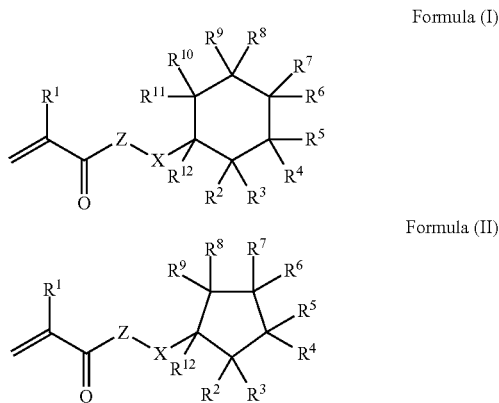

In the formulas (I) and (II), $R^1$ represents a hydrogen atom or methyl and preferably a hydrogen atom from the viewpoint of the reactivity and the flexibility of a polymer to be produced by polymerization reaction.

X represents a single bond or a divalent organic group and a preferable divalent organic group is an alkylene having 1 to 4 carbon atoms. Especially, a single bond or an alkylene having 1 or 2 carbon atoms is preferable and a single bond or methylene is more preferable. Since good adhesiveness of the ink composition to a substrate can be obtained, a single bond is more preferable.

In the formulas (I) and (II), $R^2$ to $R^{12}$ each independently represent a hydrogen atom or an alkyl group; preferably at least one selected from $R^2$ to $R^{12}$ is preferably an alkyl group and the remaining groups represent hydrogen atoms; more preferably 2 to 4 groups selected from $R^1$ to $R^{12}$ are an alkyl group; and even more preferably 2 or 3 groups selected from $R^2$ to $R^{12}$ are alkyl groups. In the case $R^2$ to $R^{12}$ are not hydrogen atoms, an alkyl group is preferably methyl, ethyl, isopropyl, and tert-butyl and a particularly preferably alkyl group is methyl.

Z represents an oxygen atom or —$NR^{13}$— and from the viewpoint of viscosity of the ink composition, it is preferably an oxygen atom. $R^{13}$ represents a hydrogen atom or an alkyl group and in the case $R^{13}$ represents an alkyl group, the alkyl group is preferably an alkyl group having 1 to 8 carbon atoms and more preferably an alkyl group having 1 to 4 carbon atoms.

In the case that at least one selected from $R^2$ to $R^{12}$ is an alkyl group and the remaining groups represent hydrogen atoms, the alkyl group may be positioned at any optional site and in terms of the flexibility of the composition after curing and adhesiveness to a substrate and availability, the alkyl group is preferably positioned at least one site selected from $R^2$, $R^4$, $R^6$, $R^8$, and $R^{12}$ and more preferably positioned at least one site selected from $R^4$, $R^6$, and $R^8$.

In the case that 2 to 4 groups selected from $R^2$ to $R^{12}$ are alkyl groups, the alkyl groups may be positioned at optional sites; preferably at 2 to 4 sites selected from $R^2$, $R^4$, $R^5$, $R^6$, $R^8$, and $R^9$; and more preferably at 2 to 4 sites selected from $R^4$, $R^5$, $R^8$, and $R^9$.

In the case that 2 or 3 groups selected from $R^2$ to $R^{12}$ are alkyl groups, the alkyl groups may be positioned at optional sites; preferably at 2 or 3 sites selected from $R^2$, $R^4$, $R^5$, $R^6$, $R^8$, and $R^9$; and more preferably at 2 or 3 sites selected from $R^2$, $R^4$, $R^6$, $R^8$, and $R^9$.

Examples particularly preferable as the (meth)acrylic acid ester having an alicyclic group as a substituent or amide having an alicyclic group as a substituent may be (meth) acrylic acid esters having an alicyclic group or amides having an alicyclic group and represented by the following formulas (III) and (IV).

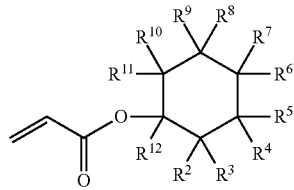

Formula (III)

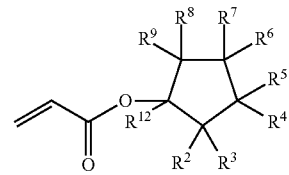

Formula (IV)

In the formulas (III) and (IV), the groups represented by $R^2$ to $R^{12}$, preferable examples of the groups, and the preferable positions in the case that the groups represent alkyl groups are the same as described for the formulas (I) and (II).

Concrete examples preferably usable in the invention for the (meth)acrylic acid ester having an alicyclic group as a substituent or amide having an alicyclic group as a substituent are the following compounds (B-1) to (B-20), however the invention should not be limited to these exemplified compounds. Further, in the case that the respectively exemplified compounds have steric isomers, any isomers of the compounds may be used and mixtures of the isomers may be also usable.

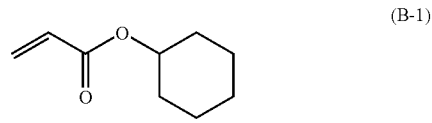
(B-1)

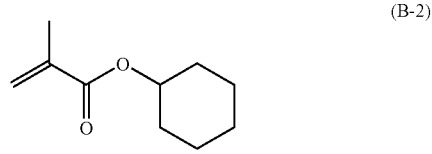
(B-2)

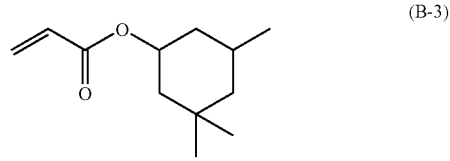
(B-3)

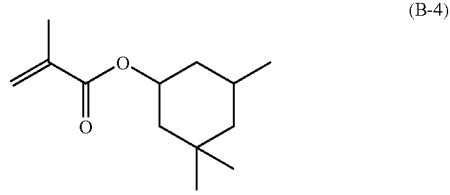
(B-4)

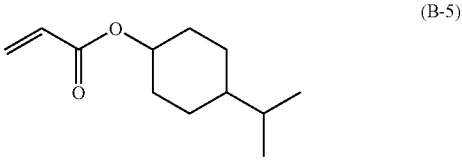
(B-5)

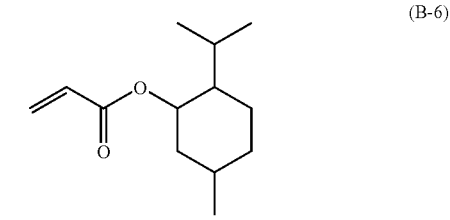
(B-6)

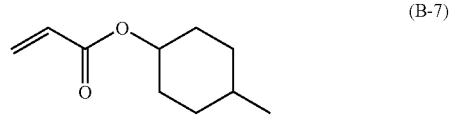
(B-7)

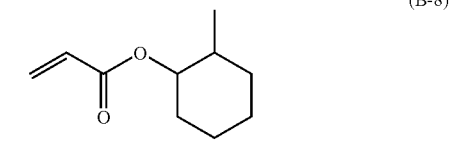
(B-8)

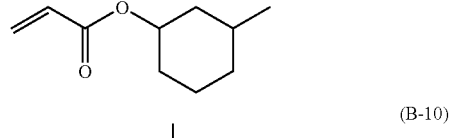
(B-9)

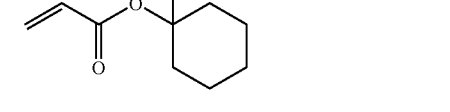
(B-10)

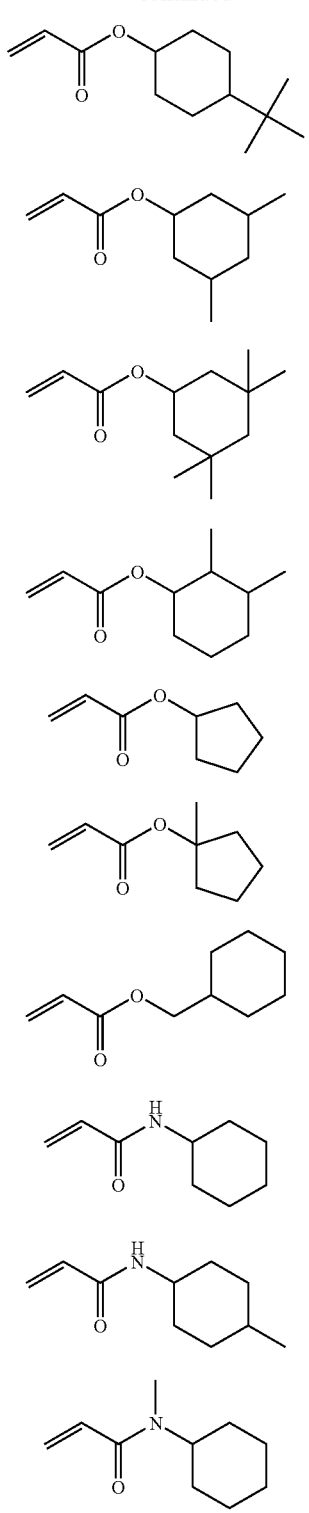

The content of the component (B) in the ink composition of the invention is preferably in a range from 3 to 35% by mass and more preferably in a range from 4 to 25% by mass in the total mass of the ink composition from the viewpoint of the balance between the curing speed and the adhesiveness to a substrate and ink jetting suitability of the ink composition. One or more kinds of the component (B) may be used.

(A) Polymerization Initiator

The ink composition of the invention contains at least one polymerization initiator. Any one of known polymerization initiators may be used as each of the at least one polymerization initiator. The polymerization initiator may be a radical polymerization initiator in the invention.

The polymerization initiator used in the ink composition of the invention is a compound which absorbs external energy to generate polymerization-initiating species. Examples of the external energy used to initiate polymerization are generally classified into heat and radiation ray.

For heat and radiation ray, a thermal polymerization initiator and a photopolymerization initiator are used respectively. Examples of the radiation rays include γ-rays, β-rays, electron beams, ultraviolet rays, visible rays, and infrared rays.

The thermal or photopolymerization initiator may be any one of known compounds such as the following compounds.

(A-1) Radical Polymerization Initiator

Typical examples of the radical polymerization initiator that can be preferably used in the invention include (a) aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds containing at least one carbon-halogen bond, and (m) alkylamine compounds.

One of these radical polymerization initiators may be used alone, or two or more of them may be used together.

(A-2) Cationic Polymerization Initiator

As described later, when the ink composition of the invention further contains at least one cationic polymerizable compound, the ink composition preferably contains at least one cationic polymerization initiator.

In the invention, the cationic polymerization initiator (photo acid generating agent) is preferably one of compounds used in chemically amplified photoresists or optical cationic polymerization (see pages 187 to 192 of *Organic Materials for Imaging* edited by The Japanese Research Association for Organic Electronics Materials and published by Bun-Shin Shuppan in 1993). Typical examples of the cationic polymerization initiator preferably usable in the invention include the following compounds.

First, $B(C_6F_5)_4^-$, $PF_6^-$, $AsF_6^-$, $SbF_6^-$, and $CF_3SO_3^-$ salts of aromatic onium compounds (e.g., diazonium, ammonium, iodonium, sulfonium, and phosphonium) can be used. Second, sulfonated compounds that generate sulfonic acid may be used. Third, halogenated compounds that optically generate hydrogen halides can be used. Fourth, iron-allene complexes may be used.

One of these cationic polymerization initiators may be used alone, or two or more of them can be used together in the invention.

The polymerization initiator (A) in the invention is added in a range preferably from 0.01 to 35% by mass, more preferably from 0.1 to 30% by mass, and even more preferably from 0.5 to 30% by mass relative to the total amount of the component (B) or relative to the total amount of the polymerizable compound if another polymerizable compound (C) is used in combination with the component (B) as an optional component.

The polymerization initiator (A) in the invention is added at a ratio of polymerization initiator (A) to a sensitizing dye (E) by mass which may be used, if necessary, as described later in a range from (200:1) to (1:200), more preferably from (50:1) to (1:50), and even more preferably from (20:1) to (1:5).

The ink composition of the invention may further contain other component(s) in addition to the above essential components, for example, to improve the physical properties of the ink composition, unless the component(s) does not adversely affect the advantageous effects of the invention. Additional components that the ink composition may contain will be described below.

[Another Polymerizable Compound (C)]

The ink composition of the invention may also preferably contain another polymerizable compound (C) in addition to the component (B). Examples of the polymerizable compound usable in combination in the invention are radical polymerizable compounds and/or cationic polymerizable compounds.

Another polymerizable compound (C) may be properly selected in relation to the aimed properties and the polymerization initiator (A).

(C-1) Radical Polymerizable Compound

The radical polymerizable compound is a compound having a radical polymerizable ethylenic unsaturated bond, and has at least one radical polymerizable ethylenic unsaturated bond in the molecule thereof. The radical polymerizable compound may be in the chemical form of a monomer, an oligomer, or a polymer. Only one radical polymerizable compound may be used alone. Alternatively, two or more radical polymerizable compounds may be used together at an arbitrary ratio to improve at least one of the properties of the ink composition. Combined use of two or more radical polymerizable compounds is preferable to control reactivity and the physical properties of the ink composition.

The polymerizable compound having at least one radical polymerizale ethylenic unsaturated bond may be unsaturated carboxylic acid such as acrylic acid, methacrylic acid, itaconic acid, crotonic acid, isocrotonic acid or maleic acid or a salt thereof, anhydride having at least one ethylenic unsaturated group, acrylonitrile, styrene, unsaturated polyester, unsaturated polyether, unsaturated polyamide, or unsaturated urethane.

Specific examples thereof include acrylic acid derivatives such as 2-ethylhexyl acrylate, 2-hydroxyethyl acrylate, butoxyethyl acrylate, carbitol acrylate, tetrahydrofurfuryl acrylate, benzyl acrylate, bis(4-acryloxypolyethoxyphenyl) propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethyrolpropane triacrylate, tetramethylolmethane tetraacrylate, oligoester acrylates, N-methylol acrylamide, diacetone acrylamide, and epoxy acrylates; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethyrolpropane trimethacrylate, and 2,2-bis(4-methacryloxypolyethoxyphenyl)propane; and derivatives of allyl compounds such as allyl glycidyl ether, diallyl phthalate, and triallyl trimellitate. More specifically, radical polymerizable or cross-linkable monomers, oligomers and polymers commercially available or known in the art, including those described in *Cross-linking Agent Handbook* edited by Shinzo Yamashita and published by Taisei Publisher in 1981, *UV or EB Curing Handbook (Raw Material Book)* edited by Kiyoshi Kato and published by Kobunshi Kankokai in 1985, *Application and Market of UV or EB Curing Technology* (p. 79) edited by RadTech Japan published by CMC publisher in 1989, and *Polyester Resin Handbook* written by Eiichiro Takiyama and published by Nikkankogyo Shimbun in 1988, the disclosures of which are incorporated herein by reference, can also be used as such.

Furthermore, photocurable polymerizable compounds used in photopolymerizable compositions described in, for example, JP-A No. H07-159983, Japanese Publication of Examined Patent Application (JP-B) No. H07-31399, JP-A Nos. H08-224982, H10-863, and H09-134011 are known as the radical polymerizable compounds, and at least one of them can also be used in the ink composition of the invention.

Further, a vinyl ether compound is preferably usable as the radical polymerizable compound to be used in combination with the component (C-1).

Preferably usable examples of the vinyl ether compound are di- or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexanedimethanol divinyl ether, hydroxyethyl monovinyl ether, hydroxynonyl monovinyl ether, and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-O-propylene carbonate, dodecyl vinyl ether, diethylene glycol monovinyl ether, and octadecyl vinyl ether.

Among these vinyl ether compounds, from the viewpoint of the curability, adhesiveness, and surface hardness, divinyl ether compounds and trivinyl ether compounds are preferable and divinyl ether compounds are particularly preferable. In the invention, one of the above-mentioned vinyl ether compounds may be used alone or two or more of them may be used in combination.

The vinyl ether compound may be added in an amount in a range preferably from 0 to 40% by mass and more preferably from 1 to 20% by mass in a liquid component of an oxolane group-containing compound and an oxetane ring-containing compound.

(C-2) Cationic Polymerizable Compound

The ink composition of the invention may further contain at least one cationic polymerizable compound, as needed.

The cationic polymerizable compound for use in the invention is required to initiate polymerization reaction in the presence of the acid generated by an agent that optically generates acid to be cured, and otherwise there is no particular limit thereto. The cationic polymerizable compound can be any of cationic polymerizable monomers known as photo-cationic polymerizable monomers. Examples of the cation polymerizable monomers include epoxy, vinyl ether, and oxetane compounds described in JP-A Nos. H06-9714, 2001-31892, 2001-40068, 2001-55507, 2001-310938, 2001-310937, and 2001-220526.

For example, polymerizable compounds contained in a cationic polymerizable, photocurable resin are also known as the cationic polymerizable compounds. In recent years, polymerizable compounds contained in photocationic polymerizable, photocurable resins sensitized to visible light within the wavelength region of 400 nm or more are disclosed in JP-A Nos. H06-43633 and H08-324137. These can also be used in the ink composition of the invention.

(C-3) Preferred Other Polymerizable Compound

Each of other polymerizable compound(s) usable in the invention is preferably (meth)acrylic ester of a (meth)acrylic monomer or prepolymer, an epoxy monomer or prepolymer, or an urethane monomer or prepolymer (hereinafter, referred to as an "acrylate compound" in some cases). Each of Other polymerizable compound(s) is more preferably one of the following compounds.

That is, 2-ethylhexyl-diglycol acrylate, 2-hydroxy-3-phenoxypropyl acrylate, 2-hydroxybutyl acrylate, hydroxypivalic acid neopentylglycol diacrylate, 2-acryloyloxyethylphthalic acid, methoxy-polyethylene glycol acrylate, tetramethylolmethane triacrylate, 2-acryloyloxyethyl-2-hydroxyethylphthalic acid, dimethyloltricyclodecane diacrylate, ethoxylated phenyl acrylate, 2-acryloyloxyethylsuccinic acid, nonylphenol EO adduct acrylate, modified glycerine triacrylate, bisphenol A diglycidyl ether acrylic acid adduct, modified bisphenol A diacrylate, phenoxy-polyethylene glycol acrylate, 2-acryloyloxyethyl hexahydrophthalic acid, bisphenol A PO adduct diacrylate, bisphenol A EO adduct diacrylate, dipentaerythritol hexaacrylate, pentaerythritol triacrylate tolylene diisocyanate urethane prepolymer, lactone-modified flexible acrylate, butoxyethyl acrylate, propylene glycol diglycidyl ether acrylic acid adduct, pentaerythritol triacrylate hexamethylene diisocyanate urethane prepolymer, 2-hydroxyethyl acrylate, methoxydipropylene glycol acrylate, ditrimethylolpropane tetraacrylate, pentaerythritol triacrylate hexamethylene diisocyanate urethane prepolymer, stearyl acrylate, isoamyl acrylate, isomyristyl acrylate, isostearyl acrylate, and lectone-modified acrylate can be used as such.

These acrylate compounds have less skin irritation and less sensitizing property (less causing rash) as compared with polymerizable compounds which have been used as UV-curable inks. Further, the viscosity of each of the acrylate compounds can be relatively low, and the acrylate compounds allow ink to be stably ejected, and have high polymerization sensitivity, and strong adhesiveness to recording media.

(C) The monomers described as other polymerizable compounds have a low skin sensitizing property, high reactivity, low viscosity, and strong adhesiveness to recording media, even if the compounds have a low molecular weight.

In order to further improve sensitivity, ink bleeding resistance, and adhesiveness to recording media, it is preferable to use at least one of polyfunctional acrylate monomers and polyfunctional acrylate oligomers having molecular weight of 400 or more, preferably 500 or more, together with at least one of the aforementioned monoacrylates as polymerizable compounds. In particular, it is preferable that an ink composition used to record images on a soft recording medium such as a PET or PP film contains at least one monoacrylate selected from the aforementioned compounds and polyfunctional acrylate monomers or polyfunctional acrylate oligomers in combination, so as to obtain a film having flexibility, strong adhesiveness and strength.

It is particularly preferable to use at least three types of polymerizable compounds of at least one monofunctional monomer, at least one bifunctional monomer, and at least one tri- or higher-functional monomer in combination as polymerizable compounds so as to further improve sensitivity, ink bleeding resistance, and adhesiveness to recording media while keeping safety.

The monoacrylate is preferably stearyl acrylate, isoamyl acrylate, isomyristyl acrylate, or isostearyl acrylate, because they have high sensitivity and low contractility, and can prevent curling and ink bleeding, and can reduce odor of printed matters and cost of a light irradiation apparatus.

Epoxy or urethane acrylate oligomer is particularly preferably used as the oligomer used in combination with the monoacrylate.

Methacrylates have less skin irritation than acrylates.

Among the above compounds, it is preferable to use a mixture containing an alkoxy acrylate in a content of less than 70% by mass and the remainder being an acrylate to obtain an ink composition having good sensitivity, bleeding resistance, and odor properties.

In the case that the above-mentioned acrylate compounds are used as the polymerizable compound (C) in the invention, the acrylate compounds are used in an amount of 30% by mass or more, preferably 40% by mass or more, and further preferably 50% by mass or more relative to the total mass of other polymerizable compounds [that is, the total amount of the components (C)]. All of other polymerizable compounds (C) may be the above-mentioned acrylate compounds.

<Content of Polymerizable Compound>

Total content of the polymerizable compounds in the invention (that is, the total of the component (B) and another polymerizable compound (C) to be used in the invention) is in a range from 45 to 95% by mass and preferably from 50 to 90% by mass, with respect to the total mass of the ink composition of the invention.

The content of the component (B) to be contained in the entire content of the ink composition of the invention (that is, the total content of the component (B) and the component (C)) is in a range preferably from 7% by mass or higher, more preferably 10% by mass or higher, and even more preferably 15% by mass or higher.

The polymerization initiator(s) and polymerizable compound(s) are selected in the present invention such that the decrease in sensitivity due to the light-shielding effect of the colorant(s) in the ink composition is prevented. For example, the ink composition may contain a combination of at least one cationic polymerizable compound and at least one cationic polymerization initiator, a combination of at least one radical polymerizable compound and at least one radical polymerization initiator, or may be a radical-cationic hybrid curable ink containing the both combinations.

(D) Colorant

When the ink composition of the invention is used to form image regions of planographic printing plates, the image regions are not needed to be colored, in general. However, when the image regions are required to have improved visibility or when the ink composition of the invention is used to form a colored image, the ink composition may contain at least one colorant (D).

There is no limitation to particular colorant(s) that can be used in the invention. However, each of the at least one colorant is preferably a pigment (D-1) or an oil-soluble dye (D-2), which has good weather resistance and color reproducibility, and may be any one of those known as such, including soluble dyes. A colorant which can be used in the ink composition or the ink composition for ink jet recording of the invention is preferably selected from the compounds which do not function as a polymerization inhibitor in polymerization reaction, which is a curing reaction, in light of preventing decrease in sensitivity to the curing reaction caused by actinic radiation.

D-1 Pigment

The pigment is not limited to a particular one for use in the invention. Examples thereof include organic and inorganic pigments described in Color Index and having the following numbers.

As for red and magenta pigments, the pigment may be Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, or Pigment Orange 13, 16, 20, or 36.

As for blue and cyan pigments, the pigment may be Pigment Blue 1, 15, 15:1, 15:2, 15:3, 15:4, 15:6, 16, 17-1, 22, 27, 28, 29, 36, or 60.

As for green pigments, the pigment may be Pigment Green 7, 26, 36, or 50.

As for yellow pigments, the pigment may be Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, or 193.

As for black pigments, the pigment may be Pigment Black 7, 28, or 26.

As for white pigments, the pigment may be Pigment White 6, 18, or 21.

These can be used according to the purposes.

D-2 Oil-Soluble Dye

Hereinafter, the oil-soluble dye usable in the invention will be described. The oil-soluble dye usable in the invention is substantially insoluble in water.

Specifically, the solubility of the oil-soluble dye in water at 25° C. (mass of the dye soluble in 100 g of water) is 1 g or less, preferably 0.5 g or less, and more preferably 0.1 g or less. Thus, examples of the oil-soluble dye include so-called water-insoluble pigments and oil-soluble colorants. Among them, the oil-soluble dye is preferably an oil-soluble colorant.

When the oil-soluble dye usable in the invention is a yellow dye, any yellow dyes may arbitrarily be used. Examples thereof include aryl- and heteryl-azo dyes each having as the coupling moiety a phenol, naphthol, aniline, pyrazolone, pyridone, or open-chain active methylene moiety; azomethine dyes having as the coupling moiety an open-chain active methylene moiety; methine dyes such as benzylidene dyes and monomethine oxonol dyes; quinone dyes such as naphthoquinone dyes and anthraquinone dyes; quinophtharone dyes; nitro and nitroso dyes; acridine dyes; and acridinone dyes.

When the oil-soluble dye usable in the invention is a magenta dye, any magenta dyes may arbitrarily be used. Examples thereof include aryl- and heteryl-azo dyes each having as the coupling moiety a phenol, naphthol, or aniline moiety; azomethine dyes having as the coupling moiety a pyrazolone or pyrazolotriazole moiety; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, and anthrapyridones; and fused polycyclic dyes such as dioxazine dyes.

When the oil-soluble dye usable in the invention is a cyan dye, any cyan dyes may arbitrarily be used. Examples thereof include azomethine dyes such as indoaniline dyes, indophenol dyes, and dyes having a pyrrolotriazole moiety as the coupling moiety; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl- and heteryl-azo dyes each having as the coupling moiety a phenol, naphthol, or aniline moiety; and indigo and thioindigo dyes.

The dye may be a compound having a chromophore (color-forming atomic group) that dissociates to form a color such as yellow, magenta, or cyan. In this case, the dye has a counter cation, which may be an inorganic cation such as an alkali metal or an ammonium group, or an organic cation such as a pyridinium group or a quaternary ammonium salt, or a polymeric cation having, as the partial structure, a cation selected from those described above.

Typical examples thereof include, but are not limited to, C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2.

Examples of products serving as such colorants include NUBIAN BLACK PC-0850, OIL BLACK HBB, OIL YELLOW 129, OIL YELLOW 105, OIL PINK 312, OIL RED 5B, OIL SCARLET 308, VALI FAST BLUE 2606, and OIL BLUE BOS (manufactured by Orient Chemical Industries); AIZEN SPILON BLUE GNH (manufactured by Hodogaya Chemical Co., Ltd.); and NEOPEN YELLOW 075, NEOPEN MAGENTA SE1378, NEOPEN BLUE 808, NEOPEN BLUE FF4012, and NEOPEN CYAN FF4238 (manufactured by BASF).

In the invention, one of these oil-soluble dyes may be used alone, or two or more of them can be used together.

When the ink composition of the invention includes an oil-soluble dye as the colorant, the ink composition may further contain other colorant(s) such as a water-soluble dye, a disperse dye, or a pigment in an amount that does not adversely affect the advantageous effects of the invention.

The ink composition of the invention may contain at least one disperse dye in such an amount that the at least one disperse dye can be dissolved in a water-immiscible organic solvent or solvents. Examples of the disperse dye generally include water-soluble dyes. However, the disperse dye is preferably used in such an amount that it can be dissolved in the water-immiscible organic solvent in the invention, as described above. Typical examples thereof include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

Preferably, the colorant for use in the invention is added to other components of the ink composition or the ink composition for ink jet recording of the invention, and moderately dispersed therein. Any of various dispersing machines, such as a ball mill, a sand mill, an attritor, a roll mill, an agitator, HENSCHEL mixer, a colloid mill, an ultrasonic wave homogenizer, a pearl mill, a wet-type jet mill, or a paint shaker, may be used to disperse the colorant.

In addition, the ink composition of the invention may further contain at least one dispersant to disperse the colorant therein. There is no particular limit to the type of each of the at least one dispersant. However, the dispersant is preferably a polymeric dispersant. The polymer dispersant is, for example, one of SOLSPERSE series manufactured by Zeneca company. When the ink composition of the invention contains a pigment, the ink composition may further contain, as a dispersion aid, at least one synergist suitable for the type of the pigment. In the invention, the total amount of the dispersant(s) and the dispersion aid(s) is preferably 1 to 50 parts by mass with respect to 100 parts of the colorant(s).

The colorant may be added directly together with the respective components at the time of producing the ink composition of the invention, however to improve the dispersibility, it may be added after being added and homogeneously dispersed or uniformly dissolved in the component (B) or a dispersant such as another polymerizable compound (C) to be added in combination if necessary.

In the invention, the colorant is preferably added to and mixed with one of at least one polymerizable compound including the (B) components or a mixture thereof to avoid use of a solvent, which may remain in a cured image and reduce the solvent resistance of the image, and problems regarding volatile organic compounds (VOC). When only dispersion suitability is considered, the polymerizable compound(s) used in the addition of the colorant(s) is preferably a monomer having the lowest viscosity.

One or more of those colorants may be used according to the application of the ink composition.

When the ink composition includes a colorant that remains as solid therein, such as a pigment, it is preferable that the types of the colorant, a dispersant, and a dispersion medium, and dispersion and filtration conditions are so properly selected as to control the average diameter of the colorant particles within the range of 0.005 to 1.5 μm. The average diameter is more preferably 0.01 to 1.2 μm, and still more preferably 0.015 to 1.0 μm. Controlling the average diameter of the colorant particles can suppress clogging of a nozzle head and allows preservation of the storage stability, transparency and curing sensitivity of the ink.

A desired content for the colorant(s) in the ink composition of the invention may be determined properly according to the application of the ink composition. However, the content of the colorant(s) in the ink composition is preferably 1 to 10% by mass, and more preferably 2 to 8% by mass, considering the physical properties and the color-forming property of the ink composition.

(E) Sensitizing Dye

The ink composition of the invention may contain at least (E) one sensitizing dye to accelerate decomposition of (A) the polymerization initiator(s) caused by irradiation with actinic rays. The sensitizing dye absorbs particular actinic radiation and is then electronically excited. When the electronically excited sensitizing dye comes into contact with a polymerization initiator, electron transfer, energy transfer, and heat generation occur. As a result, the polymerization initiator chemically changes, that is, decomposes, and generates radicals, acid or base.

Compounds to be used as the sensitizing dye may be compounds having absorption wavelengths corresponding to the wavelength of the actinic radiation light for generating initiator species in the polymerization initiator (A) to be used in the ink composition. Examples preferable for the sensitizing dye are compounds exemplified below and having absorption wavelength in a range from 350 nm to 450 nm.

Polynuclear aromatic compounds (e.g. anthracene, pyrene, perylene, and triphenylene), thioxanthones (e.g. isopropylthioxanthone), xanthenes (e.g. fluorescein, Eosine, erythrosine, Rhodamine B, Rose Bengal), cyanines (e.g. thiacarbocyanine and oxacarbocyanine), merocyanines (e.g. merocyanine and carbomerocyanine), thiazines (e.g. Thionine, Methylene Blue, and Toluidine Blue), acridines (e.g. Acridine Orange, chloroflavin, and acriflavine), anthraquinones (e.g. anthraquinone), squaryliums (e.g. squarylium), cumarins (e.g. 7-diethylamino-4-methylcumarin) and polynuclear aromatic compounds and thioxanthones are preferable.

The sensitizing dye is more preferably one of compounds represented by the following Formulae (V) to (IX).

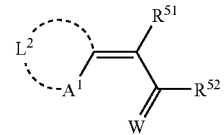

In Formula (V), $A^1$ represents a sulfur atom or $NR^{50}$; $R^{50}$ represents an alkyl group or an aryl group; $L^2$, together with the neighboring $A^1$ and carbon atom, represents a non-metal atomic group that forms the basic nucleus of a dye; $R^{51}$ and $R^{52}$ independently represent a hydrogen atom or a monovalent non-metal atomic group; and $R^{51}$ and $R^{52}$ may bind to each other to form the acidic nucleus of the dye. W represents an oxygen or sulfur atom.

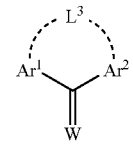

In Formula (VI), $Ar^1$ and $Ar^2$ respectively represent aryl groups that are bound to each other via an $-L^3$-bond; and $L^3$ represents —O— or —S—. W has the same meaning as in Formula (V).

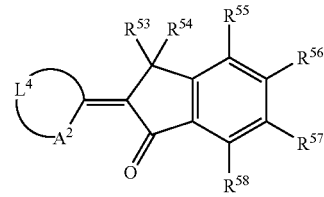

In Formula (VIII), $A^2$ represents a sulfur atom or $NR^{59}$; $L^4$, together with the neighboring $A^2$ and carbon atom, represents a non-metal atomic group that forms the basic nucleus of a dye; $R^{53}$, $R^{54}$, $R^{55}$, $R^{56}$, $R^{57}$ and $R^{58}$ independently represent a monovalent non-metal atomic group; and $R^{59}$ represents an alkyl or aryl group.

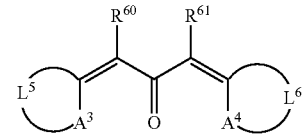

In Formula (VIII), $A^3$ and $A^4$ independently represent —S—, —$NR^{62}$—, or —$NR^{63}$—; $R^{62}$ and $R^{63}$ independently represent a substituted or unsubstituted alkyl group or a substituted or unsubstituted aryl group; $L^5$ and $L^6$, together with the corresponding one of the neighboring $A^3$ and $A^4$, and the neighboring carbon atom, independently represent a non-metal atomic group that forms the basic nucleus of a dye; and $R^{60}$ and $R^{61}$ independently represent a hydrogen atom or a monovalent non-metal atomic group, or may bind to each other to form an aliphatic or aromatic ring.

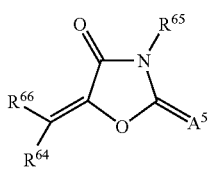

(IX)

In Formula (IX), $R^{66}$ represents an aromatic or hetero ring that may have at least one substituent; $A^5$ represents an oxygen or sulfur atom, or $-NR^{67}-$. $R^{64}$, $R^{65}$ and $R^{67}$ independently represent a hydrogen atom or a monovalent non-metal atomic group; and $R^{67}$ and $R^{64}$, and $R^{65}$ and $R^{67}$ may bind to each other to form an aliphatic or aromatic ring.

Typical examples of the compounds represented by Formulae (V) to (IX) include the compounds below.

(E-1)

(E-2)

(E-3)

(E-4)

(E-5)

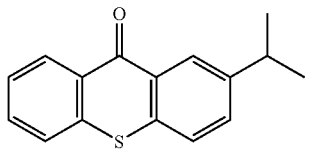
(E-6)

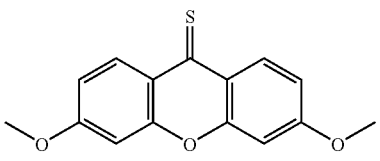
(E-7)

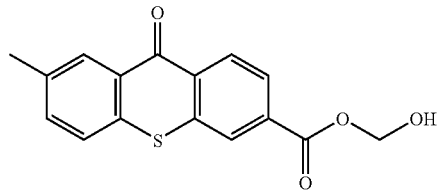
(E-8)

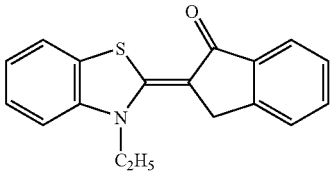
(E-9)

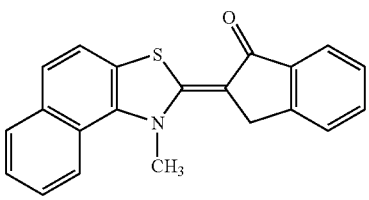
(E-10)

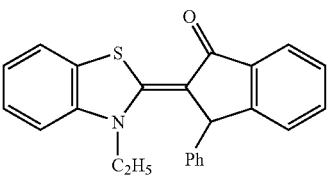
(E-11)

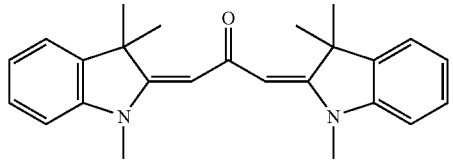
(E-12)

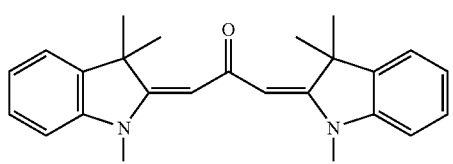
(E-13)

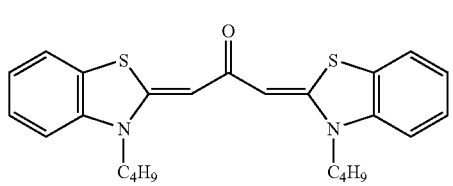
(E-14)

-continued

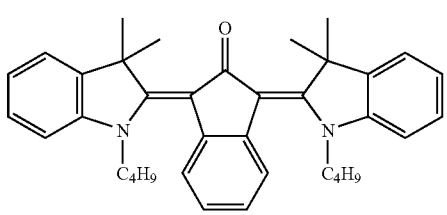
(E-15)

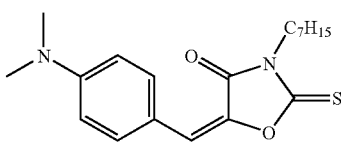
(E-16)

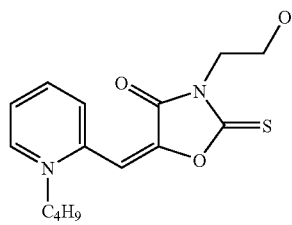
(E-17)

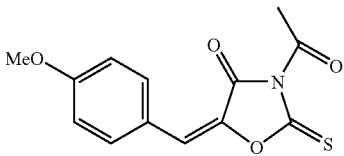
(E-18)

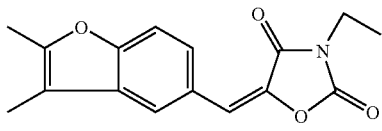
(E-19)

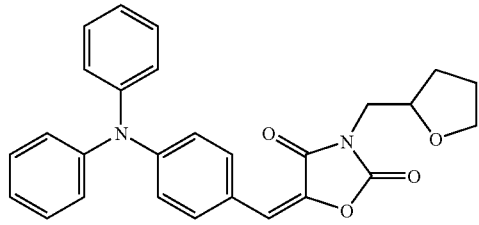
(E-20)

F) Co-Sensitizer

The ink composition of the invention may contain at least one co-sensitizer. The co-sensitizer has functions of improving the sensitivity of the sensitizing dye to actinic radiation or preventing oxygen from inhibiting polymerization of the polymerizable compound(s).

The co-sensitizer can be amine, for example, one of those described in *Journal of Polymer Society* written by M. R, Sander et al., vol. 10, p. 3173, (1972), JP-B No. S44-20189, JP-A Nos. S51-82102, S52-134692, S59-138205, S60-84305, S62-18537, and S64-33104 and Research Disclosure 33825. Specific examples thereof include triethanolamine, ethyl p-dimethylaminobenzoate, p-formyldimethylaniline, and p-methylthiodimethylaniline.

The co-sensitizer can also be thiols or sulfides, for example, thiol compounds described in JP-A No. S53-702, JP-B No. S55-500806, and JP-A No. H05-142772, and disulfide compounds described in JP-A No. S56-75643. Specific examples thereof include 2-mercaptobenzothiazole, 2-mercaptobenzoxazole, 2-mercaptobenzimidazole, 2-mercapto-4(3H)-quinazoline, and β-mercaptonaphthalene.

The co-sensitizer can also be amino acid compounds (e.g., N-phenylglycine), organic metal compounds described in JP-B No. S48-42965 (e.g., tributyltin acetate), hydrogen-donating compounds described in JP-B No. S55-34414, sulfur compounds described in JP-A No. H06-308727 (e.g., trithiane), phosphorus compounds described in JP-A No. H06-250387 (e.g., diethyl phosphite), and Si—H and Ge—H compounds described in JP-A No. H08-65779.

G) Other Components

The ink composition of the invention may further contain other component(s), if necessary. Examples of other components include at least one polymerization inhibitor, and at least one solvent.

The polymerization inhibitor may be contained to improve the storability of the ink composition. When the ink composition of the invention is used a composition for in ink jet recording, the ink composition is preferably heated at a temperature in the range of 40 to 80° C. to reduce the viscosity thereof and then ejected. In such a case, the ink composition preferably contains at least one polymerization inhibitor to prevent head clogging due to thermal polymerization. The amount of the polymerization inhibitor(s) is preferably 200 to 20,000 ppm with respect to the total amount of the ink composition of the invention. Examples of the polymerization inhibitor include hydroquinone, benzoquinone, p-methoxyphenol, TEMPO, TEMPOL, and cupferron A1.

In light of the ink composition of the invention being radiation-curable ink compositions for ink jet recording, it is preferable that these ink compositions do not contain a solvent so that the ink composition is reacted and cured rapidly immediately after an ink droplet has been impinged onto a recording medium. However, the ink composition may contain a predetermined solvent or solvents as long as the solvent(s) does not adversely affect the curing speed of the ink composition. In the invention, the solvent may be an organic solvent or water. In particular, at least one organic solvent may be contained in the ink composition to improve adhesiveness of the ink composition to a recording medium (e.g., support such as paper). Use of an organic solvent or solvents is effective to avoid problems regarding VOC.

The content of the organic solvent(s) is, for example, in the range of 0.1 to 5% by mass, and preferably in the range of 0.1 to 3% by mass with respect to the total mass of the ink composition of the invention.

In addition, the ink composition of the invention may further contain other known compound(s), if necessary. Examples of such additional compounds include at least one surfactant, at least one leveling additive, at least one matting agent, and at least one resin to adjust the physical properties of a film obtained by curing the ink composition, such as a polyester resin, polyurethane resin, vinyl resin, acrylic resin, rubber resin, and wax. Further, the ink composition preferably contains at least one tackifier that does not inhibit polymerization in order to improve adhesiveness of the ink composition to recording media made of, for example, polyolefin or PET. Specific examples thereof include high-molecular weight adhesive polymers described in JP-A No. 2001-49200, pp. 5 to 6 (e.g., a copolymer of an ester of (meth)acrylic acid and alcohol having at least one alkyl group with 1 to 20 carbon atoms, a copolymer of an ester of (meth)acrylic acid and alicyclic alcohol having 3 to 14 carbon atoms, and a copolymer of ester of (meth)acrylic acid and aromatic alcohol having 6 to 14 carbon atoms), and low-molecular weight adhesiveness-imparting resins having polymerizable unsaturated bonds.

[Properties of Ink Composition]

The ink composition of the invention can be suitably used for an ink for ink jet recording. Preferred physical properties in such an embodiment will be described.

When the ink composition of the invention is used for an ink for ink jet recording, the ink composition preferably has a good ejecting property. To attain this, the viscosity of the ink composition is preferably 7 to 30 mPa·s, and more preferably 7 to 25 mPa·s at the ejecting temperature, which is for example, within the range of 40 to 80° C. and preferably within the range of 25 to 50° C. The viscosity of the ink composition of the invention at room temperature, which is within the range of 25 to 30° C., is preferably 35 to 500 mPa·s, and more preferably 35 to 200 mPa·s.

It is preferable that the composition ratio of the ink composition is adjusted such that the viscosity of the ink composition is in the above range. When the ink composition has a high viscosity at room temperature, the ink composition can be prevented from penetrating into a recording medium even when a porous recording medium is used. In addition, the amount of uncured monomer and odor can be reduced. Further, bleeding of deposited ink droplets can be suppressed, leading to improvement of image quality.

The surface tension of the ink composition of the invention is preferably from 20 to 30 mN/m, and more preferably from 23 to 28 mN/m. When a recording medium is made of polyolefin, PET, coated paper, or non-coated paper, the surface tension of the ink composition is preferably 20 mN/m or more in view of prevention of bleeding and penetration of the ink composition, or 30 mN/m or less in view of wettability of the ink composition.

<Ink Jet Recording Method>

Hereinafter, an ink jet recording method and an ink jet recording apparatus preferably used in the invention will be described.

The ink jet recording method of the invention includes: ejecting an ink composition on a recording medium (a support, a recording material or the like) to conduct ink jet recording (step (a)), and irradiating the ink composition on the recording medium with actinic radiation to cure the ink composition (step (b)) to form an image of the invention.

That is, the ink jet recording method of the invention comprises (i-1) ejecting the ink composition of the invention on a recording medium; and (ii-1) curing the ejected ink composition by radiation with an actinic radiation beam to the ink composition.

Since the ink jet recording method of the invention comprises the above-mentioned steps (i-1) and (ii-1), an image of the cured ink composition is formed on the recording medium.

An ink jet recording apparatus as described in detail hereinafter can be used for the step (i-1) in the inkjet recording method of the invention.

[Ink Jet Recording Apparatus]

There is no particular limitations to the ink jet recording apparatus which can be uses in the recording method of the invention. Any known ink jet recording apparatuses that can provide images with desired resolution to be achieved may be selected and used. That is, any known inkjet recording apparatuses including commercially available products may be used to eject an ink on a recording medium in the step (i-1) of the ink jet recording method of the invention.

The ink jet recording apparatus for use in the invention has, for example, an ink-supplying system, a temperature sensor, and an actinic radiation source.

The ink-supplying system has, for example, a reservoir tank that stores the ink composition of the invention, supply pipes, an ink-supplying tank immediately before an ink jet head, a filter, and a piezoelectric ink jet head. Preferably, the piezoelectric ink jet head which can eject ink droplets in multi-size dots and can be so driven as to eject ink droplets having volumes of 1 to 100 pl, preferably 8 to 30 pl, at a definition of, for example, 320×320 to 4,000×4,000 dpi, preferably 400×400 to 1,600×1,600 dpi, and more preferably 720×720 dpi. The term "dpi" in the invention means the number of dots aligned per about 2.54 cm.

As described above, the radiation-curable ink such as the ink composition of the present invention is preferably heated at a constant temperature before the ejection. Therefore, heating and thermal insulation are preferably conducted in a region from the ink-supplying tank to the ink jet head. The method of controlling the temperature of the region is not specifically limited. For example, temperature sensors are preferably disposed in each of the pipes, so that heating can be controlled according to the flow rate of the ink and ambient temperature. Temperature sensors may be placed close to the ink-supplying tank and the ink jet head nozzle, respectively. Preferably, the ink jet head unit, which is used to heat the ink, has a main body that is thermally blocked or insulated such that the ink head unit is not influenced by the temperature of outside air. In order to shorten rise time of a printer necessary to heat to a predetermined temperature or reduce loss in heat energy, it is preferable to thermally insulate the ink jet head from other units and reduce the heat capacity of the entire heating unit.

The ink composition of the invention is ejected onto the surface of a hydrophilic support with an ink jet recording apparatus. At this time, it is preferable that the ink composition is heated to 40 to 80° C. (more preferably 25 to 50° C.) to lower the viscosity of the ink composition to 7 to 30 mPa·s (more preferably 7 to 25 mPa·s) before the ejection. The ink composition preferably has a viscosity of 35 to 500 mPa·s at 25° C. to obtain significant effects. In this case, it is possible to realize a high ejection stability.

Generally, the radiation-curable ink compositions, such as the ink composition of the invention, are more viscous than aqueous inks used as conventional ink jet recording inks. Therefore, the viscosity of the radiation-curable ink compositions changes significantly due to fluctuation in temperature during ejection of the ink. The fluctuation in the viscosity of the ink composition affects significantly the size of droplets and droplet ejection speed, resulting in deterioration of image quality. Thus, it is necessary to keep the temperature of the ink composition as constant as possible during ejection. The control range of the temperature of the ink composition is preferably within ±5° C., more preferably ±2° C., and still more preferably ±1° C. with respect to the set temperature of the ink composition.

The step (ii-1) of irradiating the ejected ink composition with actinic radiation to cure the ink composition will be described below.

The ink composition deposited on the recording medium is cured by irradiating the ink composition with actinic radiation. This is because (A) the polymerization initiator(s) contained in the ink composition of the invention is decomposed by irradiation of the actinic radiation to generate initiation species such as radicals, acid, or base, which initiates and accelerates polymerization reaction of the (B) components, if any, (c) other polymerizable compound(s), and causes the ink composition to cure. When the ink composition contains at least (E) one sensitizing dye as well as (A) the polymerization initiator(s), (E) the sensitizing dye(s) in the ink composition absorbs the actinic radiation and thereby becomes an excited state. When the excited sensitizing dye(s) comes into contact with (A) the polymerization initiator(s), the sensitizing dye(s) accelerates decomposition of (A) the polymerization initiator(s) to attain highly sensitive curing reaction.

Examples of the actinic radiation include α-rays, γ-rays, electron beams, X-rays, ultraviolet rays, visible light and infrared light. A desired peak wavelength of the actinic radiation ray depends on the absorption property of the sensitizing dye, if any. However, the peak wavelength of the actinic radiation ray is preferably 200 to 600 nm, more preferably 300 to 450 nm, and still more preferably 350 to 420 nm.

The polymerization initiator in the ink composition of the invention is sufficiently sensitive to an actinic radiation even at a low output level. Thus, the output of the radiation is preferably 2,000 mJ/cm$^2$ or less, more preferably 10 to 2,000 mJ/cm$^2$, still more preferably 20 to 1,000 mJ/cm$^2$, and most preferably 50 to 800 mJ/cm$^2$.

The illuminance of the actinic radiation at an exposure surface is preferably 10 to 2,000 mW/cm$^2$ and more preferably 20 to 1,000 mW/cm$^2$.

A mercury lamp, or a gas- or solid-state laser is mainly used as the actinic radiation source, and a mercury lamp or metal halide lamp is widely known as the light source to cure a UV-curable ink for ink jet recording. However, there is a strong need for mercury-free devices from the viewpoint of environmental protection. Substitution thereof with a GaN semiconductor ultraviolet ray-emitting device is very useful from the industrial and environmental standpoints. In addition, LED's (UV-LEDs) and LD's (UV-LDs), which have a small size, a long lifetime, a high efficiency and low costs, are attracting attention as light sources for ink jet printers using photo-curable ink jet ink.

A light-emitting diode (LED) or a laser diode (LD) may be used as the actinic radiation source. In particular, an ultraviolet LED or an ultraviolet LD may be used if an ultraviolet ray source is needed. For example, a purple LED emitting light with a main peak wavelength within the range of 365 to 420 nm is available from Nichia Corporation. If light having a still shorter wavelength is needed, U.S. Pat. No. 6,084,250 discloses an LED that can emit actinic radiation rays having a central wavelength within the range of 300 to 370 nm. Other ultraviolet LEDs are also commercially available. Radiation having different ultraviolet ray bands may be irradiated. The actinic radiation source in the invention is preferably a UV-LED, and more preferably a UV-LED having a peak wavelength within the range of 350 to 420 nm.

The maximum illuminance of LED on a recording medium is preferably 10 to 2,000 mW/cm$^2$, more preferably 20 to 1,000 mW/cm$^2$, and still more preferably 50 to 800 mJ/cm$^2$.

The time during which the ink composition of the invention is exposed to the actinic radiation is preferably 0.01 to 120 seconds, and more preferably 0.1 to 90 seconds.

Irradiation conditions and a basic method of irradiating actinic radiation are disclosed in JP-A No. S60-132767. Specifically, a recording medium is scan-irradiated with the actinic radiation ray in a so-called shuttle manner in which a head unit having an ink-ejecting device, and light sources placed at both sides of the head unit are driven. The irradiation with the actinic radiation is carried out when a certain period of time (e.g., 0.01 to 0.5 seconds, preferably 0.01 to 0.3 seconds, and more preferably 0.01 to 0.15 seconds) has lapsed after deposition of the ink on the recording medium. Extremely shortening a time from the ink deposition and the irradiation with the ray makes it possible to prevent bleeding of the ink deposited on the recording medium before curing. Even when the recording medium is porous, it is possible to irradiate the ink with the irradiating ray before the ink penetrates into a deeper portion of the recording medium where the irradiated rays cannot reach, in this case. Thus, the amount of unreacted residual monomer can be reduced, and odor can be consequently reduced.

Alternatively, the ink may be cured with a separate light source without moving the light source. WO 99/54415 discloses an irradiation method in which an optical fiber is used and a method of irradiating a recorded area with a collimated UV ray reflected by a mirror, onto which the collimated UV ray is irradiated, placed on the side face of the head unit. These curing methods may also be applied to the recording method of the invention.

By employing the ink jet recording method described above, it becomes possible to deposit ink droplets having a diameter kept constant on the surfaces of various recording media having different surface wettabilities and to improve image quality. To obtain a multi-color image, images of respective colors are preferably formed by superposing the colors sequentially from a low luminosity. Formation of images in this manner allows the irradiating rays to reach a deeper ink in the medium, and good curing sensitivity, decreases in the amount of the residual monomer and odor, and improved adhesiveness can be obtained. Although images of respective colors may be simultaneously irradiated with actinic radiation, it is preferable to separately irradiate the images with radiation in order to accelerate curing.

In this way, the ink composition of the invention can cure with a high sensitivity by irradiation of actinic radiation to form an image on a recording medium.

<Planographic Printing Plate and Production Method Thereof>

A planographic printing plate can be produced by applying the ink composition of the invention to a hydrophilic support in accordance with the ink jet recording method of the invention and by curing the ink composition.

Hereinafter, a method of producing a planographic printing plate to which the ink jet recording method of the present invention is applied and a planographic printing plate of the invention obtained by using this method will be described.

The planographic printing plate of the invention has a hydrophilic support and a hydrophobic image on the hydrophilic support. A method of producing the planographic printing plate includes: a step (i-2) of ejecting the ink composition of the invention on a hydrophilic support, and a step (ii-2) of irradiating the ink composition with actinic radiation to cure the ink composition to form a hydrophobic image of the cured ink composition on the hydrophilic support.

Thus, a planographic printing plate can be produced by a method that is the same as the ink jet recording method of the invention except that the recording medium is a support having a hydrophilic surface and preferably used as a support for a planographic printing plate.

As described previously, planographic printing plates have been produced by image-wise exposing a so-called PS plate having an oleophilic photosensitive resin layer on a hydrophilic support to light to solubilize or cure exposed regions to form a latent image, and dissolving and removing non-image regions. A planographic printing plate can be easily prepared by applying the ink jet recording method of the invention to the production method thereof, namely by ejecting an ink composition directly on a surface of a support according to digitized image information and curing the ink composition.

Thus, it is possible to produce a planographic printing plate more easily than ever before.

Hydrophilic Support for Planographic Printing Plate

The planographic printing plate of the invention has a hydrophilic support and a hydrophobic image disposed on the support and obtained by curing the ink composition of the invention, as aforementioned.

The support for a planographic printing plate (recording medium) onto which the ink composition of the invention or the ink for ink jet recording is ejected is a plate-like support which can be without limitation as long as the support is dimensionally stable. However, the support preferably has a hydrophilic surface in light of image quality of printed matters to be obtained.

Materials used for the support can be used as a support as such as long as the material is hydrophilic. When the material is not hydrophilic, the surface of the support may be subjected to hydrophilidizing treatment.

Examples of the material of the support include paper, paper on which at least one plastic material (e.g., polyethylene, polypropylene, or polystyrene) is laminated, plates of metal (e.g., aluminum, zinc or copper), films of plastic (e.g., cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, or polyvinyl acetal), and paper and plastic films on which at least one of those metals is laminated or deposited. The support is preferably a polyester film or an aluminum plate. Above all, the support is more preferably an aluminum plate because of good dimensional stability and relative inexpensiveness.

The aluminum plate is preferably a pure aluminum plate or an alloy plate containing aluminum as the main component and a trace amount of other elements, or a composite plate in which a plastic film is laminated on an aluminum or an aluminum alloy film. Examples of elements other than aluminum and contained in the aluminum alloy include silicon, iron, manganese, copper, magnesium, chromium, zinc, bismuth, nickel, and titanium. The content of these elements in the alloy is preferably 10% by mass or less. Although the support is most preferably a pure aluminum plate in the invention, it is difficult to refine and prepare completely pure aluminum. Therefore, the support may contain a trace amount of elements other than aluminum. There is no limitation to the composition of the aluminum plate, and any known aluminum plates may be used as the support.

The thickness of the aluminum plate is preferably 0.1 mm to 0.6 mm, and more preferably 0.15 mm to 0.4 mm.

The aluminum plate is preferably subjected to a surface treatment such as surface-roughening treatment or anodizing treatment before an image is formed on the aluminum plate. Hydrophilicity of the support and adhesiveness between a hydrophobic image and the support can be improved by the surface treatment. Prior to the surface-roughening treatment, the aluminum plate is degreased with, for example, a surfactant, an organic solvent, or an aqueous alkaline solution to remove a rolling oil on the surface thereof, if necessary.

Various methods may be used for the surface roughening of the surface of the aluminum plate. Examples thereof include a mechanical surface-roughening treatment, electrochemical surface-roughening treatment (surface-roughening by dissolving the surface of the aluminum plate electrochemically), and chemical surface-roughening treatment (surface-roughening by dissolving the surface selectively and chemically).

Any known methods such as a ball polishing method, a brush polishing method, a blast polishing method, and a buff polishing method may be used in the mechanical surface-roughening treatment. Alternatively, a method in which the surface is provided with unevennesses by a roll having an uneven surface during rolling of aluminum may be used.

The electrochemical surface-roughening may be performed by, for example, applying an alternate or direct current to the support in an electrolytic solution containing acid such as hydrochloric acid or nitric acid. The acid may also be a mixed acid described in JP-A No. S54-63902.

The aluminum plate after surface-roughening treatment may be alkali-etched with an aqueous solution containing, for example, potassium hydroxide or sodium hydroxide, neutralized, and, to improve the abrasion resistance of the support, anodized, if necessary.

An electrolyte is used in the anodization of the aluminum plate and various electrolytes that form a porous oxide film may be used. The electrolyte used in the anodization is generally sulfuric acid, hydrochloric acid, oxalic acid, chromic acid, or a mixed acid thereof. The concentration of the electrolyte suitably determined depending on the kind of the electrolyte.

The conditions of the anodization depend on the type of the electrolyte used, and are not generally defined. However, the concentration of the electrolyte(s) is preferably 1 to 80% by mass, and the temperature of the electrolytic solution is preferably 5 to 70° C., and the density of electric current is preferably 5 to 60 A/dm$^2$, and the voltage is preferably 1 to 100 V, and the electrolysis time is preferably 10 seconds to 5 minutes. The amount of the anodic oxide film formed is preferably 1.0 to 5.0 g/m$^2$, and more preferably 1.5 to 4.0 g/m$^2$. When the amount of the anodic oxide film is within the above range, the support for a planographic printing plate has good printing durability and good scratch resistance of the non-image region.

The support having the above-treated surface and having thereon the anodic oxide film described above may be used as it is, in the invention. However, the support may be subjected to further treatment, such as treatment for expanding or sealing micropores of the anodic oxide film described in JP-A Nos. 2001-253181 and 2001-322365, or surface-hydrophilizing treatment that includes immersing the support in an aqueous solution containing at least one hydrophilic compound, in order to improve adhesiveness of the support with the hydrophobic image formed thereon, hydrophilicity, and/or staining resistance, if necessary. The micropore expanding and sealing are not limited to the methods described above, and any one of known methods may be used as such.

[Micropore Sealing]

The micropore sealing may be performed by the use of vapor, fluorozirconic acid alone, an aqueous solution containing at least one inorganic fluorine compound such as sodium fluoride, vapor including lithium chloride, or hot water.

Among these, the micropore sealing is preferably conducted with an aqueous solution containing at least one inorganic fluorine compound, steam, or hot water. Each of these will be described below.

<Micropore Sealing with Aqueous Solution Containing Inorganic Fluorine Compound>

The inorganic fluorine compound contained in the aqueous solution used in the micropore sealing is preferably metal fluoride.

Specific examples thereof include sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, potassium fluorotitanate, fluorozirconic acid, fluorotitanic acid, hexafluorosilicic acid, nickel fluoride, iron fluoride, fluorophosphoric acid, and ammonium fluorophosphate. Among them, the inorganic fluorine compound is preferably sodium fluorozirconate, sodium fluorotitanate, fluorozirconic acid, or fluorotitanic acid.

The concentration of the inorganic fluorine compound(s) in the aqueous solution is preferably 0.01% by mass or higher, and more preferably 0.05% by mass or higher to sufficiently seal micropores of the anodic oxide film. Moreover, the concentration of the inorganic fluorine compound(s) in the aqueous solution is preferably 1% by mass or lower, and more preferably 0.5% by mass or lower in view of stain resistance.

Preferably, the aqueous solution containing at least one inorganic fluorine compound further contains at least one phosphate compound. When the phosphate compound is contained in the aqueous solution, the hydrophilicity of the surface of the anodic oxide film is improved, to improve developability in a printing apparatus and stain resistance.

The phosphate compound is preferably selected from metal phosphates such as phosphates of alkali metals and phosphates of alkaline earth metals.

Specific examples thereof include zinc phosphate, aluminum phosphate, ammonium phosphate, diammonium hydrogen phosphate, ammonium dihydrogen phosphate, monoammonium phosphate, monopotassium phosphate, monosodium phosphate, potassium dihydrogen phosphate, dipotassium hydrogen phosphate, calcium phosphate, sodium ammonium hydrogen phosphate, magnesium hydrogen phosphate, magnesium phosphate, ferrous phosphate, ferric phosphate, sodium dihydrogen phosphate, sodium phosphate, disodium hydrogen phosphate, lead phosphate, diammonium phosphate, calcium dihydrogen phosphate, lithium phosphate, phosphotungstic acid, ammonium phosphotungstate, sodium phosphotungstate, ammonium phosphomolybdate, sodium phosphomolybdate, sodium phosphite, sodium tripolyphosphate and sodium pyrophosphate. Among these, the phosphate compound is preferably sodium dihydrogen phosphate, disodium hydrogen phosphate, potassium dihydrogen phosphate or dipotassium hydrogen phosphate.

There is no particular limitation to combinations of the inorganic fluorine compound(s) and the phosphate compound(s). Preferably, the aqueous solution contains sodium fluorozirconate as the inorganic fluorine compound and sodium dihydrogen phosphate as the phosphate compound.

The concentration of the phosphate compound(s) in the aqueous solution is preferably 0.01% by mass or higher, and more preferably 0.1% by mass or higher to improve developability in a printing apparatus and stain resistance. The concentration of the phosphate compound(s) in the aqueous solution is preferably 20% by mass or lower, and more preferably 5% by mass or lower in respect of solubility of the phosphate compound.

There is no particular limitation to the ratio of the compounds in the aqueous solution. The mass ratio of the inorganic fluorine compound(s) to the phosphate compound(s) is preferably in the range of 1/200 to 10/1, and more preferably in the range of 1/30 to 2/1.

The temperature of the aqueous solution is preferably 20° C. or higher, and more preferably 40° C. or higher, but preferably 100° C. or lower, and more preferably 80° C. or lower.

The pH value of the aqueous solution is preferably 1 or higher, and more preferably 2 or higher, but preferably 11 or lower, and more preferably 5 or lower.

There is no particular limitation to a method of sealing micropores with the aqueous solution containing at least one inorganic fluorine compound. The method can be an immersion method or a spraying method. One of these methods can be conducted alone, or two or more of methods may be used in combination. Each sealing treatment may be conducted only once, or may be conducted twice or more.

The sealing treatment is preferably conducted by an immersion method. When an immersion method is used in the treatment, the treatment time is preferably at least 1 second, and more preferably at least 3 seconds, but preferably 100 seconds or shorter, and more preferably 20 seconds or shorter.
<Sealing with Steam>

The sealing with steam may be conducted by, for example, continuously or intermittently bringing the anodic oxide film into contact with pressurized steam or steam at atmospheric pressure.

The temperature of the steam is preferably 80° C. or higher, and more preferably 95° C. or higher, but preferably 105° C. or lower.

The pressure of the steam is preferably in the range of a value obtained by subtracting 50 mmAq from atmospheric pressure to a value obtained by adding 300 mmAq to atmospheric pressure. Specifically, the pressure of the steam is preferably in the range of $1.008 \times 10^5$ to $1.043 \times 10^5$ Pa.

The duration during which the anodic oxide film is brought into contact with steam is preferably 1 second or longer, and more preferably 3 seconds or longer, but preferably 100 seconds or shorter, and more preferably 20 seconds or shorter.
<Sealing with Hot Water>

The sealing with hot water (steam) may be conducted by, for example, immersing the aluminum plate having an anodic oxide film thereon in hot water.

The hot water may contain at least one inorganic salt (for example, a phosphate) and/or at least one organic salt.

The temperature of the hot water is preferably 80° C. or higher, and more preferably 95° C. or higher, but preferably 100° C. or lower.

The immersion time is preferably 1 second or longer, and more preferably 3 seconds or longer, but preferably 100 seconds or shorter, and more preferably 20 seconds or shorter.

The hydrophilizing may be conducted by an alkali metal silicate method such as those disclosed in U.S. Pat. Nos. 2,714,066, 3,181,461, 3,280,734, and 3,902,734. In this method, a support is immersed or electrolyzed in an aqueous solution of sodium silicate. Alternatively, the hydrophilizing can be performed by a method disclosed in JP-B No. S36-22063. In the method, a support is processed with potassium fluorozirconate. The hydrophilizing may also be conducted by a method such as those disclosed in U.S. Pat. Nos. 3,276,868, 4,153,461, and 4,689,272. In the method, a support is processed with polyvinyl phosphonic acid.

The support of the invention preferably has a center-line average roughness of 0.10 to 1.2 μm. The support whose center-line average roughness is within the above range has a good adhesiveness to a hydrophobic image, good printing durability, and good staining resistance.

(i-2) Ejecting Ink Composition onto Hydrophilic Support

First, the ink composition of the invention is ejected onto a hydrophilic support. Ink jet recording apparatuses which have been known can be used in this step, as in the above-mentioned ink jet recording method. Further, the preferred ranges of the temperature and viscosity of the ink, and a method for controlling the temperature and viscosity when ejecting the ink using the ink jet recording apparatus, are the same as in the ink jet recording method.

(ii-2) Irradiating Ink Composition with Actinic Radiation to Form Hydrophobic Image The ink composition deposited on the hydrophilic support is irradiated with actinic radiation to cure the ink composition. The details of the curing mechanism are the same as in the aforementioned ink jet recording method. An actinic radiation source used to cure the ink composition and the preferred irradiation conditions are the same as those in the ink jet recording method.

By conducting the above-mentioned processes, a hydrophobic image of the cured ink composition of the invention is formed on the surface of the hydrophilic support to form a planographic printing plate.

Using the ink jet recording method makes it possible to deposit dots having a constant diameter on various supports for the planographic printing plates that have different surface wettability, resulting in an improved hydrophobic image with high accuracy.

In this way, a planographic printing plate can be produced by irradiating the ink composition of the invention with actinic radiation to cure the ink composition and to form a hydrophobic region (a hydrophobic image) on the surface of the hydrophilic support.

Because the ink composition of the invention is cured with high sensitivity by irradiation of actinic radiation to form a hydrophobic region or regions (film or films) having an excellent adhesiveness to a support and excellent film properties, and the planographic printing plate thus obtained has a high image quality, excellent film properties and excellent printing durability.

The ink composition of the invention is useful not only for forming the image region or regions of a planographic printing plate, but also for an ink composition which can commonly be used.

EXAMPLES

Hereinafter, the invention will be described with reference to Examples, but the invention is not limited to these Examples. The following Examples relate to ink compositions for UV ink jet recording having various colors. The term "part" means "part by mass", unless otherwise indicated.

Example 1

The following components were stirred by a high speed water-cooling stirring apparatus to obtain ink with cyan color for UV ink jet.

(Cyan Color Ink Composition)

An acrylic acid ester having an alicyclic group as a substituent group (B-3): component (B) 21.0 part;
ACTILANE 421 (*: an acrylate monomer, manufactured by Akcros: component (C)) 36.0 part;
PHOTOMER 2017 (UV diluent, manufactured by EChem: component (C)) 12.4 part;
SOLSPERSE 32000 (dispersant, manufactured by Noveon) 0.4 part;
IRGALITE BLUE GLVO (pigment, manufactured by Ciba Specialty Chemicals: component (D)) 3.6 part;
GENORAD 16 (stabilizer, manufactured by Rahn) 0.05 part;
RAPI-CURE DVE-3 (vinyl ether, manufactured by ISP Europe: component (C)) 10.0 part;
LUCIRIN TPO (photo-initiator, manufactured by BASF: component (A)) 8.5 part;
benzophenone (photo-initiator: component (A)) 4.0 part;
IRGACURE 184 (photo-initiator, manufactured by Ciba Specialty Chemicals: component (A)) 4.0 part; and
BYK 307 (defoaming agent, manufactured by BYK Chemie) 0.05 part.
The product "ACTILANE 421" is propoxylated neopentyl glycol diacrylate (bifunctional acrylate).

(Evaluation of Ink)

Printing was carried out by the use of the obtained cyan color ink composition on a sheet made of polyvinyl chloride and the print was cured by passing the sheet at a speed of 40 m/min under light irradiation with an iron-doped ultraviolet lamp (power 120 W/cm) to obtain printed matter.

The following evaluation was carried out at this time.

The exposure energy at the time of curing was measured by a light quantity accumulation meter (UV Power MAP, manufactured by EIT). As a result, the integrated light exposure quantity of UV rays on the sheet was about 330 mJ/cm$^2$ to find that the curing occurred with a high sensitivity.

The curability was evaluated through examination by touch the image part of the printed matter obtained using the ink after curing. As a result, the stickiness completely disappeared after curing to find that the curability was excellent.

The adhesiveness to the recording medium was evaluated according to a cross-hatch test (EN ISO2409) to find that a high adhesiveness was provided and the value was equal to 4B on the basis of the standard by the ASTM method.

Further, the flexibility was evaluated on the basis of the cracking degree formed in the cured film after the sheet was folded ten times. The folding test was evaluated in 5 grades marking 5 points when no crack was formed and in the evaluation, in the case of 3 points or higher, it is regarded there is no problem for practical use and according to the evaluation, only slight cracks which affect scarcely the quality of the printed image were observed and the rank of the test example was 3 points.

The results are shown in the following Table 1.

Example 2

The following components were stirred by a high speed water-cooling stirring apparatus to obtain ink with magenta color for UV ink jet.

(Magenta Color Ink Composition)

An acrylic acid ester having an alicyclic group as a substituent group (B-6): component (B) 14.0 part;
ACTILANE 421 (the above-mentioned acrylate monomer, manufactured by Akcros: component (C)) 38.4 part;
PHOTOMER 2017 (UV diluent, manufactured by EChem: component (C)) 19.0 part;
SOLSPERSE 32000 (dispersant, manufactured by Noveon) 0.4 part;
CINQUASIA MAGENTA RT-355D (pigment, manufactured by Ciba Specialty Chemicals: component (D)) 3.6 part;
GENORAD 16 (stabilizer, manufactured by Rahn) 0.05 part;
RAPI-CURE DVE-3 (vinyl ether, manufactured by ISP Europe: component (C)) 8.0 part;
LUCIRIN TPO (photo-initiator, manufactured by BASF: component (A)) 8.5 part;
benzophenone (photo-initiator: component (A)) 4.0 part;
IRGACURE 184 (photo-initiator, manufactured by Ciba Specialty Chemicals: component (A)) 4.0 part; and
BYK 307 (defoaming agent, manufactured by BYK Chemie) 0.05 part.

Printing was carried out by the use of the obtained magenta color ink composition was printed on a sheet made of polyvinyl chloride and the print was cured by passing the sheet at a speed of 40 m/min under light irradiation with an iron-doped ultraviolet lamp (power 120 W/cm) to obtain printed matter. The printed matter obtained using this ink was evaluated in the same manner as Example 1.

The results are shown in the following Table 1.

Example 3

The following components were stirred by a high speed water-cooling stirring apparatus to obtain ink with yellow color for UV ink jet.

(Yellow Color Ink Composition)

An acrylic acid ester having an alicyclic group as a substituent group (B-11): component (B) 12.0 part;
ACTILANE 421 (the above-mentioned acrylate monomer, manufactured by Akcros: component (C)) 36.4 part;
PHOTOMER 2017 (UV diluent, manufactured by EChem: component (C)) 25.0 part;
SOLSPERSE 32000 (dispersant, manufactured by Noveon) 0.4 part;
CROMOPHTAL YELLOW LA (pigment, manufactured by Ciba Specialty Chemicals: component (D)) 3.6 part;
GENORAD 16 (stabilizer, manufactured by Rahn) 0.05 part;
RAPI-CURE DVE-3 (vinyl ether, manufactured by ISP Europe: component (C)) 6.0 part;
Lucirin TPO (photo-initiator, manufactured by BASF: component (A)) 8.5 part;
benzophenone (photo-initiator: component (A)) 4.0 part;
IRGACURE 184 (photo-initiator, manufactured by Ciba Specialty Chemicals: component (A)) 4.0 part; and
BYK 307 (defoaming agent, manufactured by BYK Chemie) 0.05 part.

Printing was carried out by the use of the obtained yellow color ink composition was printed on a sheet made of polyvinyl chloride and the print was cured by passing the sheet at a speed of 40 m/min under light irradiation with an iron-doped ultraviolet lamp (power 120 W/cm) to obtain printed matter. The printed matter obtained using this ink was evaluated in the same manner as Example 1.

The results are shown in the following Table 1.

Example 4

The following components were stirred by a high speed water-cooling stirring apparatus to obtain ink with black color for UV ink jet.

(Black Color Ink Composition)

An acrylic acid ester having an alicyclic group as a substituent group (B-3): component (B) 26.0 part;
ACTILANE 421 (the above-mentioned acrylate monomer, manufactured by Akcros: component (C)) 31.4 part;
PHOTOMER 2017 (UV diluent, manufactured by EChem: component (C)) 16.0 part;
SOLSPERSE 32000 (dispersant, manufactured by Noveon) 0.4 part;
MICROLITH BLACK C-K (pigment, manufactured by Ciba Specialty Chemicals: component (D)) 2.6 part;
GENORAD 16 (stabilizer, manufactured by Rahn) 0.05 part;
RAPI-CURE DVE-3 (vinyl ether, manufactured by ISP Europe: component (C)) 7.0 part;
LUCIRIN TPO (photo-initiator, manufactured by BASF: component (A)) 8.5 part;
benzophenone (photo-initiator: component (A)) 4.0 part;
IRGACURE 184 (photo-initiator, manufactured by Ciba Specialty Chemicals: component (A)) 4.0 part; and
BYK 307 (defoaming agent, manufactured by BYK Chemie) 0.05 part.

Printing was carried out by the use of the obtained black color ink composition was printed on a sheet made of polyvinyl chloride and the print was cured by passing the sheet at a speed of 40 m/min under light irradiation with an iron-doped ultraviolet lamp (power 120 W/cm) to obtain printed matter. The printed matter obtained using this ink was evaluated in the same manner as Example 1.

The results are shown in the following Table 1.

Example 5

The following components were stirred by a high speed water-cooling stirring apparatus to obtain ink with cyan color for UV ink jet.

(Cyan Color Ink Composition)

An acrylic acid ester having an alicyclic group as a substituent group (B-13): component (B) 12.0 part;
ACTILANE 422 (*: an acrylate monomer, manufactured by Akcros: component (C)) 64.4 part;
SOLSPERSE 32000 (dispersant, manufactured by Noveon) 0.4 part;
IRGALITE Blue GLVO (pigment, manufactured by Ciba Specialty Chemicals: component (D)) 3.6 part;
GENORAD 16 (stabilizer, manufactured by Rahn) 0.05 part;
RAPI-CURE DVE-2 (vinyl ether, manufactured by ISP Europe: component (C)) 5.0 part;
LUCIRIN TPO (photo-initiator, manufactured by BASF: component (A)) 8.5 part;
benzophenone (photo-initiator: component (A)) 4.0 part;
IRGACURE 184 (photo-initiator, manufactured by Ciba Specialty Chemicals: component (A)) 4.0 part; and
BYK 307 (defoaming agent, manufactured by BYK Chemie) 0.05 part.

* Actilane 422 is dipropylene glycol diacrylate (bi-functional acrylate)

Printing was carried out by the use of the obtained cyan color ink composition was printed on a sheet made of polyvinyl chloride and the print was cured by passing the sheet at a speed of 40 m/min under light irradiation with an iron-doped ultraviolet lamp (power 120 W/cm) to obtain printed matter. The printed matter obtained using this ink was evaluated in the same manner as Example 1. The results are shown in the following Table 1.

Example 6

The following components were stirred by a high speed water-cooling stirring apparatus to obtain ink with cyan color for UV ink jet.

(Cyan Color Ink Composition)

An acrylic acid ester having an alicyclic group as a substituent group (B-3): component (B) 25.0 part;
KAYARAD HDDA (*: an acrylate monomer, manufactured by Nippon Kayaku Co., Ltd.: component (C)) 12.6 part;
ACTILANE 421 (an acrylate monomer, manufactured by Akcros: component (C)) 45.0 part;
SOLSPERSE 32000 (dispersant, manufactured by Noveon) 0.4 part;
SOLSPERSE 5000 (dispersant, manufactured by Noveon) 0.05 part;
IRGALITE BLUE GLVO (pigment, manufactured by Ciba Specialty Chemicals: component (D)) 1.4 part;
GENORAD 16 (stabilizer, manufactured by Rahn) 0.05 part;
RAPI-CURE DVE-3 (vinyl ether, manufactured by ISP Europe: component (C)) 5.0 part;
LUCIRIN TPO (photo-initiator, manufactured by BASF: component (A)) 8.0 part;
benzophenone (photo-initiator: component (A)) 2.0 part;

IRGACURE 184 (photo-initiator, manufactured by Ciba Specialty Chemicals: component (A)) 4.0 part; and BYK 307 (defoaming agent, manufactured by BYK Chemie) 0.5 part.

* KAYARAD HDDA is 1,6-hexanediol diacrylate (bi-functional acrylate)

Printing was carried out by the use of the obtained cyan color ink composition was printed on a sheet made of polyvinyl chloride and the print was cured by passing the sheet at a speed of 40 m/min under light irradiation with an iron-doped ultraviolet lamp (power 120 W/cm) to obtain printed matter. The printed matter obtained using this ink was evaluated in the same manner as Example 1. The results are shown in the following Table 1.

Comparative Example 1

The following components were stirred by a high speed water-cooling stirring apparatus to obtain ink with cyan color for UV ink jet.

(Cyan Color Ink Composition)

KAYARAD HDDA (*: an acrylate monomer, manufactured by Nippon Kayaku Co., Ltd.: component (C)) 12.6 part;

ACTILANE 421 (the above-mentioned acrylate monomer, manufactured by Akcros: component (C)) 70.0 part;

SOLSPERSE 32000 (dispersant, manufactured by Noveon) 0.4 part;

SOLSPERSE 5000 (dispersant, manufactured by Noveon) 0.05 part;

IRGALITE BLUE GLVO (pigment, manufactured by Ciba Specialty Chemicals: component (D)) 1.4 part;

GENORAD 16 (stabilizer, manufactured by Rahn) 0.05 part;

RAPI-CURE DVE-3 (vinyl ether, manufactured by ISP Europe: component (C)) 5.0 part;

LUCIRIN TPO (photo-initiator, manufactured by BASF: component (A)) 8.0 part;

benzophenone (photo-initiator: component (A)) 2.0 part;

IRGACURE 184 (photo-initiator, manufactured by Ciba Specialty Chemicals: component (A)) 4.0 part; and BYK 307 (defoaming agent, manufactured by BYK Chemie) 0.5 part.

Printing was carried out by the use of the obtained cyan color ink composition was printed on a sheet made of polyvinyl chloride and the print was cured by passing the sheet at a speed of 40 m/min under light irradiation with an iron-doped ultraviolet lamp (power 120 W/cm) to obtain printed matter. The printed matter obtained using this ink was evaluated in the same manner as Example 1. The results are shown in the following Table 1.

Comparative Example 2

The following components were stirred by a high speed water-cooling stirring apparatus to obtain ink with cyan color for UV ink jet.

(Cyan Color Ink Composition)

Lauryl acrylate (NK ester LA: component (C)) 25.0 part;

KAYARAD HDDA (*: an acrylate monomer, manufactured by Nippon Kayaku Co., Ltd.: component (C)) 12.6 part;

ACTILANE 421 (an acrylate monomer, manufactured by Akcros: component (C)) 45.0 part;

SOLSPERSE 32000 (dispersant, manufactured by Noveon) 0.4 part;

SOLSPERSE 5000 (dispersant, manufactured by Noveon) 0.05 part;

IRGALITE BLUE GLVO (pigment, manufactured by Ciba Specialty Chemicals: component (D)) 1.4 part;

GENORAD 16 (stabilizer, manufactured by Rahn) 0.05 part;

RAPI-CURE DVE-3 (vinyl ether, manufactured by ISP Europe: component (C)) 5.0 part;

LUCIRIN TPO (photo-initiator, manufactured by BASF: component (A)) 8.0 part;

benzophenone (photo-initiator: component (A)) 2.0 part;

IRGACURE 184 (photo-initiator, manufactured by Ciba Specialty Chemicals: component (A)) 4.0 part; and BYK 307 (defoaming agent, manufactured by BYK Chemie) 0.5 part.

Printing was carried out by the use of the obtained cyan color ink composition was printed on a sheet made of polyvinyl chloride and the print was cured by passing the sheet at a speed of 40 m/min under light irradiation with an iron-doped ultraviolet lamp (power 120 W/cm) to obtain printed matter. The printed matter obtained using this ink was evaluated in the same manner as Example 1. The results are shown in the following Table 1.

TABLE 1

| | Exposure dose (mJ/cm$^2$) | Curability | Adhesiveness (ASTM) | Flexibility |
| --- | --- | --- | --- | --- |
| Example 1 | 330 | Good | 4B | 3 |
| Example 2 | 330 | Good | 3B | 3 |
| Example 3 | 330 | Good | 3B | 3 |
| Example 4 | 330 | Good | 4B | 3 |
| Example 5 | 330 | Good | 3B | 3 |
| Example 6 | 330 | Good | 4B | 3 |
| Comparative Example 1 | 330 | Good | 1B | 1 |
| Comparative Example 2 | 330 | Inferior | — | — |

* The folding test was carried on the basis of sensory evaluation of 5 points in the case that no crack was caused.

As made clear from Table 1, all of the ink compositions of Examples 1 to 6 were found curable with high sensitivity and excellent in the curability of the image parts and adhesiveness to the recording medium.

On the other hand, the ink composition of Comparative Example 1 containing no component (B) but mainly containing the bi-functional acrylate was insufficient in the adhesiveness and showed inferior result in the cross-hatch test for the practical use although it showed good curability.

Further, the ink composition of Comparative Example 1 containing lauryl acrylate in place of the component (B) was found so insufficient in the curability as to make evaluation of the cured film impossible.

Example 7

Preparation of Support

Molten aluminum was prepared by melting an aluminum alloy containing 0.06 mass % of silicon, 0.30 mass % of iron, 0.025 mass % of copper, 0.001 mass % of manganese, 0.001 mass % of magnesium, 0.001 mass % of zinc, 0.03 mass % of titanium, a trace amount of unavoidable impurities, and the remaining of aluminum. The molten aluminum was subjected to a process necessary to obtain a desired casting, filtered and molded into ingots having a thickness of 500 mm and a width of 1,200 mm by DC casting.

The surface portion of the ingot which surface portion had an average depth of 10 mm was shaved off by a facing attachment, and the ingot was soaked at 550° C. for approximately 5 hours. After the ingot cooled to 400° C., the ingot was rolled into a rolled plate having a thickness of 2.7 mm with a hot rolling mill. The plate was heated at 500° C. with a continuous annealing machine and cold-rolled into an aluminum plate having a thickness of 0.24 mm, which satisfied the requirements stipulated in JIS 1050. As for the average size of the aluminum crystals in the aluminum plate, the minor and major axes were 50 μm and 300 μm, respectively. After a piece having a width of 1,030 mm was cut from the aluminum plate, the piece was subjected to the following surface treatment so as to prepare an aluminum support.

<Surface Treatment>

The aluminum support was continuously subjected to the following treatments (1) to (10). The processing solution remaining on the aluminum plate was removed by a nip roller, after each treatment and washing with water.

(1) Mechanical Surface Roughening Treatment

The aluminum plate was surface-roughened mechanically with revolving nylon brush rollers, while a suspension containing an abrasive (pumice) having a specific gravity of 1.12 and water was supplied to the surface of the aluminum plate as a polishing slurry. The average diameter of the abrasive particles was 30 μm, and the maximum diameter was 100 μm. Each of the nylon brush rollers was made of 6.10 nylon, and had bristles whose length and diameter were 45 mm and 0.3 mm, respectively. Each of the nylon brush rollers was prepared by drilling a stainless steel tube having a diameter of 300 mm and densely bristling the stainless steel tube in the holes thereof. The number of the revolving nylon brush rollers was three. Two support rollers (diameter of 200 mm) were disposed below the brush rollers, with the distance therebetween being 300 mm. The brush rollers were pressed against the aluminum plate so that the load of a drive motor that rotated the brush rollers during the pressing was 7 kW heavier than that before the roller was pressed. The rotation direction of the brush rollers was the same as the traveling direction of the aluminum plate. The rotational frequency of the brush rollers was 200 rpm.

(2) Alkali Etching Treatment

The aluminum plate thus obtained was etched by spraying an aqueous solution containing 2.6 mass % of caustic soda and 6.5 mass % of aluminum ion content onto the plate and kept at a temperature of 70° C. Thereby, the aluminum plate was dissolved so that the amount of dissolved aluminum was 10 g/m$^2$. The aluminum plate was then washed with water by spraying.

(3) Desmutting Treatment

The aluminum plate was desmutted by spraying an aqueous solution kept at a temperature of 30° C. and containing 1 mass % of nitric acid and 0.5 mass % of aluminum ions onto the plate. The aluminum plate was then washed with water by spraying. The aqueous solution containing nitric acid used in the desmutting was the waste water discharged from the step of the following electrochemical surface-roughening treatment using AC current in an aqueous nitric acid solution.

(4) Electrochemical Surface-Roughening Treatment

The aluminum plate was surface-roughened electrochemically, continuously, while AC voltage having a frequency of 60 Hz was used. The electrolytic solution used in this treatment was an aqueous solution containing 10.5 g/L of nitric acid, 5 g/L of aluminum ions and 0.007 mass % of ammonium ions, and the temperature of the electrolytic solution was 50° C. In the electrochemical surface-roughening treatment, an alternate current having trapezoidal waves with a period, which was necessary to raise an electric current value from zero to the peak, of 0.8 msec and a duty ratio of 1:1 was used, and a carbon electrode was used as a counter electrode. A ferrite anode was used as an auxiliary anode.

The electric current density was 30 A/dm$^2$ at a peak current value. The total amount of the electric current at the time when the aluminum plate was used as the anode was 220 C/dm$^2$. Part (5%) of the current from power source was supplied to the auxiliary electrode. Subsequently, the aluminum plate was washed with water by spraying.

(5) Alkali Etching Treatment

The aluminum plate was etched by spraying an aqueous solution containing 26 mass % of caustic soda and 6.5 mass % of aluminum ions onto the plate and kept at 32° C. Thereby, the aluminum plate was dissolved so that the amount of dissolved aluminum was 0.50 g/m$^2$. Smuts including as the main component aluminum hydroxide and occurred in the electrochemical surface-roughening treatment using AC current were removed and the edge regions of the resultant pits were dissolved to smoothen the edge regions. Subsequently, the aluminum plate was washed with water by spraying.

(6) Desmutting Treatment

The aluminum plate was desmutted by spraying an aqueous solution kept at a temperature of 30° C. and containing 15 mass % of nitric acid and 4.5 mass % of aluminum ions onto the plate. The aluminum plate was then washed with water by spraying. The aqueous solution containing nitric acid used in the desmutting was the waste water discharged from the aforementioned step of electrochemical surface-roughening treatment using AC current in an aqueous nitric acid solution.

(7) Electrochemical Surface-Roughening Treatment

The aluminum plate was surface-roughened electrochemically, continuously, while AC voltage having a frequency of 60 Hz was used. The electrolytic solution used in this treatment was an aqueous solution containing 5.0 g/L of hydrochloric acid and 5 g/L of aluminum ions, and the temperature of the electrolytic solution was 35° C. In the electrochemical surface-roughening treatment, an alternate current having trapezoidal waves with a period, which was necessary to raise an electric current value from zero to the peak, of 0.8 msec and a duty ratio of 1:1 was used, and a carbon electrode was used as a counter electrode. A ferrite anode was used as an auxiliary anode.

The electric current density was 25 A/dm$^2$ at a peak current value. The total amount of electric current at the time when the aluminum plate was used as the anode was 50 C/dm$^2$. Subsequently, the aluminum plate was washed with water by spraying.

(8) Alkali Etching Treatment

The aluminum plate was etched by spraying an aqueous solution containing 26 mass % of caustic soda and 6.5 mass % of aluminum ions onto the plate and kept at 32° C. Thereby, the aluminum plate was dissolved so that the amount of dissolved aluminum was 0.12 g/m$^2$. Smuts including as the main component aluminum hydroxide and occurred in the electrochemical surface-roughening treatment using AC current were removed and the edge regions of the resultant pits were dissolved to smoothen the edge regions. Subsequently, the aluminum plate was washed with water by spraying.

(9) Desmutting Treatment

The aluminum plate was desmutted by spraying an aqueous solution kept at a temperature of 60° C. and containing 25 mass % of sulfuric acid and 0.5 mass % of aluminum ions onto the plate. The aluminum plate was then washed with water by spraying.

(10) Anodizing Treatment

The aluminum plate was anodized with an anodic oxidation apparatus that included first and second electrolysis units each having a length of 6 m, first and second power supply units each having a length of 3 m, and first and second power supply units each having a length of 2.4 m. The electrolytic solution supplied to the first and second electrolysis units included sulfuric acid. More specifically, the electrolytic solution was an aqueous solution containing 50 g/L of sulfuric acid and 0.5 mass % of aluminum ions and kept at a temperature of 20° C. The aluminum plate was then washed with water by spraying. The amount of the oxide layer thus prepared was 2.7 g/m².

Preparation and Evaluation of Planographic Printing Plate

The ink composition of Example 1 was ejected onto the aluminum support thus prepared and was cured in the same manner as in Example 1. Thus, a planographic printing plate was obtained and was evaluated as to the following items.

(a). Evaluation of Image

Ink [VALUES-G red for sheets (manufactured by Dainippon Ink and Chemicals, Inc.)] and dampening water [ECOLITY 2 (manufactured by Fuji Photo Film)] were applied to the planographic printing plate with an image obtained by curing the ink composition, and the planographic printing plate was loaded in a HEIDEL KOR-D printing machine. The image was printed on 100 sheets of paper and the image on the 100th sheet was evaluated visually. It was confirmed that the image had no missing portion of the image region and no stain in the non-image region.

(b). Evaluation of Printing Durability

The image on the planographic printing plate was further printed on sheets of paper. 10,000 or more prints having no missing portion of an image region and no stain in a non-image region could be obtained. This shows that the planographic printing plate had practically acceptable printing durability.

As described, according to the invention, there is provided an ink composition which is cured with a high sensitivity by actinic radiation and forms an image with high quality and sufficient flexibility by curing the ink and also there is provided with an ink jet recording method using the ink composition.

Further, the invention provides a planographic printing plate obtained by using the ink composition curable with a high sensitivity by actinic radiation (particularly preferably UV rays) and a production method of the planographic printing plate.

The planographic printing plate of the invention is produced by the production method of the planographic printing plate of the invention.

The invention may include following aspects:

(1). An ink composition comprising: (A) a polymerization initiator; and (B) a (meth)acrylic acid ester having an alicyclic group as a substituent or an amide having an alicyclic group as a substituent.

(2). The ink composition of (1) further comprising a colorant.

(3). The ink composition of (1) or (2) further comprising a sensitizing dye.

(4). An ink jet recording ink of the composition according to any one of (1) to (3).

(5). An ink jet recording method comprising: ejecting the ink composition of any one of (1) to (3) onto a recording medium; and curing the ejected ink composition by irradiating actinic radiation to the ink composition.

(6). A method of producing a planographic printing plate, the method comprising: ejecting the ink composition of any one of (1) to (4) onto a hydrophilic support; and curing the ejected ink composition by irradiating with actinic radiation to the ink composition and thereby forming a hydrophobic image of the cured ink composition on the hydrophilic support.

(7). A planographic printing plate produced by the method of producing a planographic printing plate according to (6).

What is claimed is:

1. An ink composition comprising:
   (A) a polymerization initiator;
   (B) a (meth)acrylic acid ester or amide having an alicyclic group as a substituent and, represented by the following formula (I) or (II):

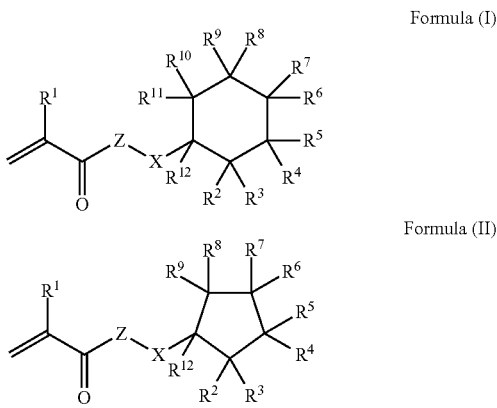

wherein $R^1$ represents a hydrogen atom or a methyl group; $R^2$ to $R^{12}$ each independently represents a hydrogen atom or an alkyl group, with the proviso that at least two of $R^2$ to $R^{12}$ respectively represent an alkyl group; Z represents an oxygen atom or —$NR^{13}$—; $R^{13}$ represents a hydrogen atom or an alkyl group; and X represents a single bond or a divalent organic group; and
   (C) another polymerizable compound,
   wherein the ink composition has a viscosity of from 7 to 30 mPa•s within an ejecting temperature range of from 25 to 50 ° C.

2. The ink composition of claim 1 further comprising a colorant.

3. The ink composition of claim 2 further comprising a sensitizing dye.

4. An ink jet recording ink of the composition according to claim 3.

5. An ink jet recording method comprising:
   ejecting the ink composition of claim 3 onto an recording medium; and
   curing the ejected ink composition by irradiating actinic radiation to the ink composition.

6. A method of producing a planographic printing plate, the method comprising:
   ejecting the ink composition of claim 3 onto a hydrophilic support; and
   curing the ejected ink composition by irradiating activation radiation to the ink composition and thereby forming a hydrophobic image of the cured ink composition on the hydrophilic support.

7. A planographic printing plate produced by the method of producing a planographic printing plate according to claim 6.

8. An ink jet recording ink of the composition according to claim 2.

9. An ink jet recording method comprising:
   ejecting the ink composition of claim 2 onto a recording medium; and
   curing the ejected ink composition by irradiating actinic radiation to the ink composition.

10. A method of producing a planographic printing plate, the method comprising:
ejecting the ink composition of claim 2 onto a hydrophilic support; and
curing the ejected ink composition by irradiating actinic radiation to the ink composition and thereby forming a hydrophobic image of the cured ink composition on the hydrophilic support.

11. A planographic printing plate produced by the method of producing a planographic printing plate according to claim 10.

12. The ink composition of claim 1 further comprising a sensitizing dye.

13. An ink jet recording ink of the composition according to claim 12.

14. An ink jet recording method comprising:
ejecting the ink composition of claim 12 onto an recording medium; and
curing the ejected ink composition by irradiating actinic radiation to the ink composition.

15. A method of producing a planographic printing plate, the method comprising:
ejecting the ink composition of claim 12 onto a hydrophilic support; and
curing the ejected ink composition by irradiating actinic radiation to the ink composition and thereby forming a hydrophobic image of the cured ink composition on the hydrophilic support.

16. A planographic printing plate produced by the method of producing a planographic printing plate according to claim 15.

17. A method of producing a planographic printing plate, the method comprising:
ejecting the ink composition of claim 1 onto a hydrophilic support; and
curing the ejected ink composition by irradiating with actinic radiation to the ink composition and thereby forming a hydrophobic image of the cured ink composition on the hydrophilic support.

18. An ink jet recording ink of the composition according to claim 1.

19. An ink jet recording method comprising:
ejecting the ink composition of claim 1 onto a recording medium; and
curing the ejected ink composition by irradiating actinic radiation to the ink composition.

20. A planographic printing plate produced by the method of producing a planographic printing plate according to claim 17.

21. The ink composition of claim 1, wherein the alkyl group represented by any one of $R^2$ to $R^{12}$ is selected from the group consisting of a methyl group, an ethyl group, an isopropyl group, and a tert-butyl group.

22. The ink composition of claim 1, wherein the alkyl group represented by any one of $R^2$ to $R^{12}$ is a methyl group.

23. The ink composition of claim 1, wherein the total content of the (meth)acrylic acid ester or amide (B) represented by Formula (I) or (II) and the another polymerizable compound (C) is in a range from 45% by mass to 95% by mass with respect to the total mass of the ink composition.

24. The ink composition of claim 1, wherein the content of the (meth)acrylic acid ester or amide (B) represented by Formula (I) or (II) is in a range from 3 to 35% by mass with respect to the total mass of the ink composition.

25. The ink composition of claim 1, wherein the surface tension of the ink composition is from 20 to 30 mN/m.

26. The ink composition of claim 1, wherein the polymerization initiator (A) comprises an acylphosphine oxide compound.

27. The ink composition of claim 1, further comprising a pigment as a colorant.

28. The ink composition of claim 1, wherein the (meth)acrylic acid ester or amide (B) represented by Formula (I) or (II) is selected from the group consisting of compounds B-3, B-6, B-11 and B-13:

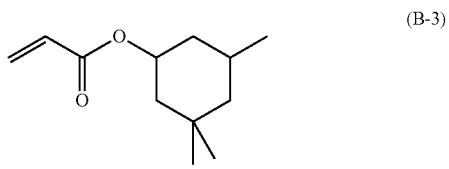

(B-3)

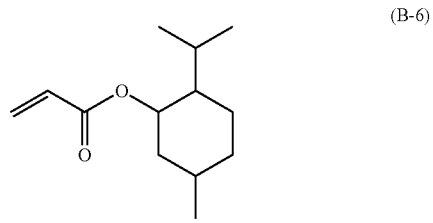

(B-6)

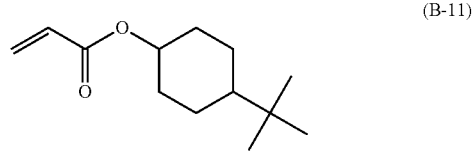

(B-11)

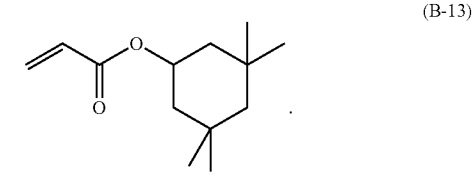

(B-13)

* * * * *